(12) United States Patent
Ozay et al.

(10) Patent No.: US 12,304,487 B2
(45) Date of Patent: May 20, 2025

(54) SAFE AUTONOMOUS OVERTAKING WITH INTENTION ESTIMATION

(71) Applicant: THE REGENTS OF THE UNIVERSITY OF MICHIGAN, Ann Arbor, MI (US)

(72) Inventors: Necmiye Ozay, Ann Arbor, MI (US);
Vishnu S. Chipade, Ann Arbor, MI (US); Qiang Shen, Tempe, AZ (US);
Lixing Huang, Ann Arbor, MI (US);
Sze Zheng Yong, Mesa, AZ (US);
Dimitra Panagou, Ann Arbor, MI (US)

(73) Assignees: The Regents of the University of Michigan, Ann Arbor, MI (US); AZ Brd Regents on Behalf of AZ State University, Scottsdale, AZ (US)

( * ) Notice: Subject to any disclaimer, the term of this patent is extended or adjusted under 35 U.S.C. 154(b) by 76 days.

(21) Appl. No.: 16/360,572

(22) Filed: Mar. 21, 2019

(65) Prior Publication Data

US 2020/0298859 A1 Sep. 24, 2020

(51) Int. Cl.
*B60W 30/18* (2012.01)
*B60W 30/095* (2012.01)
*G05D 1/00* (2024.01)
*G08G 1/16* (2006.01)

(52) U.S. Cl.
CPC .. *B60W 30/18163* (2013.01); *B60W 30/0956* (2013.01); *G05D 1/0088* (2013.01); *G08G 1/167* (2013.01)

(58) Field of Classification Search
CPC ........ B60W 30/18163; B60W 30/0956; G05D 1/0088; G05D 2201/0213; G08G 1/167
See application file for complete search history.

(56) References Cited

U.S. PATENT DOCUMENTS 9,174,672 B2 * 11/2015 Zeng ................. B62D 15/0265
2006/0047402 A1 * 3/2006 Irion ................. B60K 31/0008
701/93

(Continued)

FOREIGN PATENT DOCUMENTS

GB 2558866 A 7/2018

OTHER PUBLICATIONS

Carvalho, et al., Stochastic Predictive Control of Autonomous Vehicles in Uncertain Environments, In 12th International Symposium on Advanced Vehicle Control, 2014, pp. 712-719.

(Continued)

*Primary Examiner* — Naeem Taslim Alam
(74) *Attorney, Agent, or Firm* — Quarles & Brady LLP

(57) ABSTRACT

The present disclosure provides a method in a data processing system that includes at least one processor and at least one memory. The at least one memory includes instructions executed by the at least one processor to implement a vehicle overtaking system. The method includes causing a vehicle control system in an ego vehicle to execute at least a portion of an input control sequence, receiving, from a first plurality of sensors coupled to the ego vehicle, lead vehicle data about a lead vehicle, estimating an intention of the lead vehicle based on the lead vehicle data, and causing the vehicle control system to perform a vehicle maneuver based on the intention of the lead vehicle.

25 Claims, 8 Drawing Sheets

(56) References Cited

U.S. PATENT DOCUMENTS

| | | | | |
|---|---|---|---|---|
| 2015/0057835 | A1* | 2/2015 | Streubel | B60W 30/0953 701/1 |
| 2015/0367854 | A1* | 12/2015 | Ezoe | B60W 30/18163 701/1 |
| 2016/0059858 | A1* | 3/2016 | Heinrich | G08G 1/167 701/23 |
| 2016/0318511 | A1* | 11/2016 | Rangwala | B60Q 1/525 |
| 2017/0016740 | A1* | 1/2017 | Cui | G01C 21/30 |
| 2017/0080952 | A1* | 3/2017 | Gupta | B60K 35/81 |
| 2017/0101102 | A1* | 4/2017 | Matei | G05D 1/0259 |
| 2017/0326981 | A1* | 11/2017 | Masui | G01S 13/86 |
| 2018/0012491 | A1* | 1/2018 | Liu | G08G 1/096791 |
| 2018/0182245 | A1* | 6/2018 | Takabayashi | G08G 1/167 |
| 2018/0253976 | A1* | 9/2018 | Inam | G08G 1/22 |
| 2019/0054922 | A1* | 2/2019 | Yalla | B60W 10/20 |
| 2019/0163205 | A1* | 5/2019 | Kodera | B60W 10/20 |
| 2019/0375410 | A1* | 12/2019 | Zinner | B60W 30/095 |
| 2020/0012286 | A1* | 1/2020 | Delp | G05D 1/249 |
| 2020/0180636 | A1* | 6/2020 | Oh | B60W 30/09 |
| 2020/0233414 | A1* | 7/2020 | Akella | G06V 20/58 |
| 2020/0286392 | A1* | 9/2020 | Miller | G06T 7/20 |
| 2020/0298843 | A1* | 9/2020 | Matsunaga | B60W 40/04 |

OTHER PUBLICATIONS

Cesari, et al., Scenario Model Predictive Control for Lane Change Assistance and Autonomous Driving on Highways, IEEE Intelligent Transportation Systems Magazine, 2017, 9(3):23-35.

Chebly, et al., Trajectory Planning and Tracking for Autonomous Vehicles Navigation, Automatic Control Engineering, Universite de Technologie de Compiegne, 2017, 218 pages.

Ding, et al., Optimal Input Design for Affine Model Discrimination with Applications in Intention-Aware Vehicles, In Proceedings of the 9th ACM/IEEE International Conference on Cyber-Physical Systems, IEEE Press, 2018, pp. 297-307.

Fisac, et al., Hierarchical Game—Theoretic Planning for Autonomous Vehicles, In 2019 International Conference on Robotics and Automation (ICRA), IEEE, 2019, pp. 9590-9596.

Garg, et al., New Results on Finite-Time Stability: Geometric Conditions and Finite-Time Controllers, In 2018 Annual American Control Conference (ACC), IEEE, 2018, pp. 442-447.

Harirchi, et al., Active Model Discrimination with Applications to Fraud Detection in Smart Buildings, IFAC PapersOnLine, 2017, 50-1:9527-9534.

Katrakazas, et al., Real-Time Motion Planning Methods for Autonomous On-Road Driving: State-of-the-Art and Future Research Directions, Transportation Research Part C, 2015, 60:416-442.

Lefevre, et al., A Survey on Motion Prediction and Risk Assessment for Intelligent Vehicles, Robomech Journal, 2014, 1:1, 14 pages.

Murgovski, et al., Predictive Cruise Control with Autonomous Overtaking, In 2015 54th IEEE Conference on Decision and Control (CDC), IEEE, 2015, pp. 644-649.

Nikoukhah, et al., Auxiliary Signal Design for Active Failure Detection in Uncertain Linear Systems with a Priori Information, Automatica, 2006, 42:219-228.

Panagou, A Distributed Feedback Motion Planning Protocol for Multiple Unicycle Agents of Different Classes, IEEE Transactions on Automatic Control, 2016, 62(3):1178-1193.

Schwarting, et al., Planning and Decision-Making for Autonomous Vehicles, Annual Review of Control, Robotics and Autonomous Systems, 2018, 1:187-210.

Scott, et al., Input Design for Guaranteed Fault Diagnosis Using Zonotopes, Automatica, 2014, 50:1580-1589.

Singh, et al., Input Design for Nonlinear Model Discrimination via Affine Abstraction, IFAC PapersOnLine, 2018, 51(16):175-180.

Van Brummelen, et al., Autonomous Vehicle Perception: The Technology of Today and Tomorrow, Transportation Research Part C, 2018, 89:384-406.

Volpe, et al., Manipulator Control with Superquadric Artificial Potential Functions: Theory and Experiments, IEEE Transactions on Systems, Man, and Cybernetics, 1990, 20(6):1423-1436.

Wang, et al., Safe Distributed Lane Change Maneuvers for Multiple Autonomous Vehicles Using Buffered Input Cells, In IEEE International Conference on Robotics and Automation (ICRA), IEEE, 2018, pp. 1-7.

Gurobi Optimization, Inc., Gurobi Optimizer Reference Manual, Version 7.0, Copyright 2017, 693 pages.

IBM ILOG CPLEX Optimization Studio CPLEX User's Manual, Version 12 Release 6, Copyright IBM Corporation 1987, 2015, 564 pages.

* cited by examiner

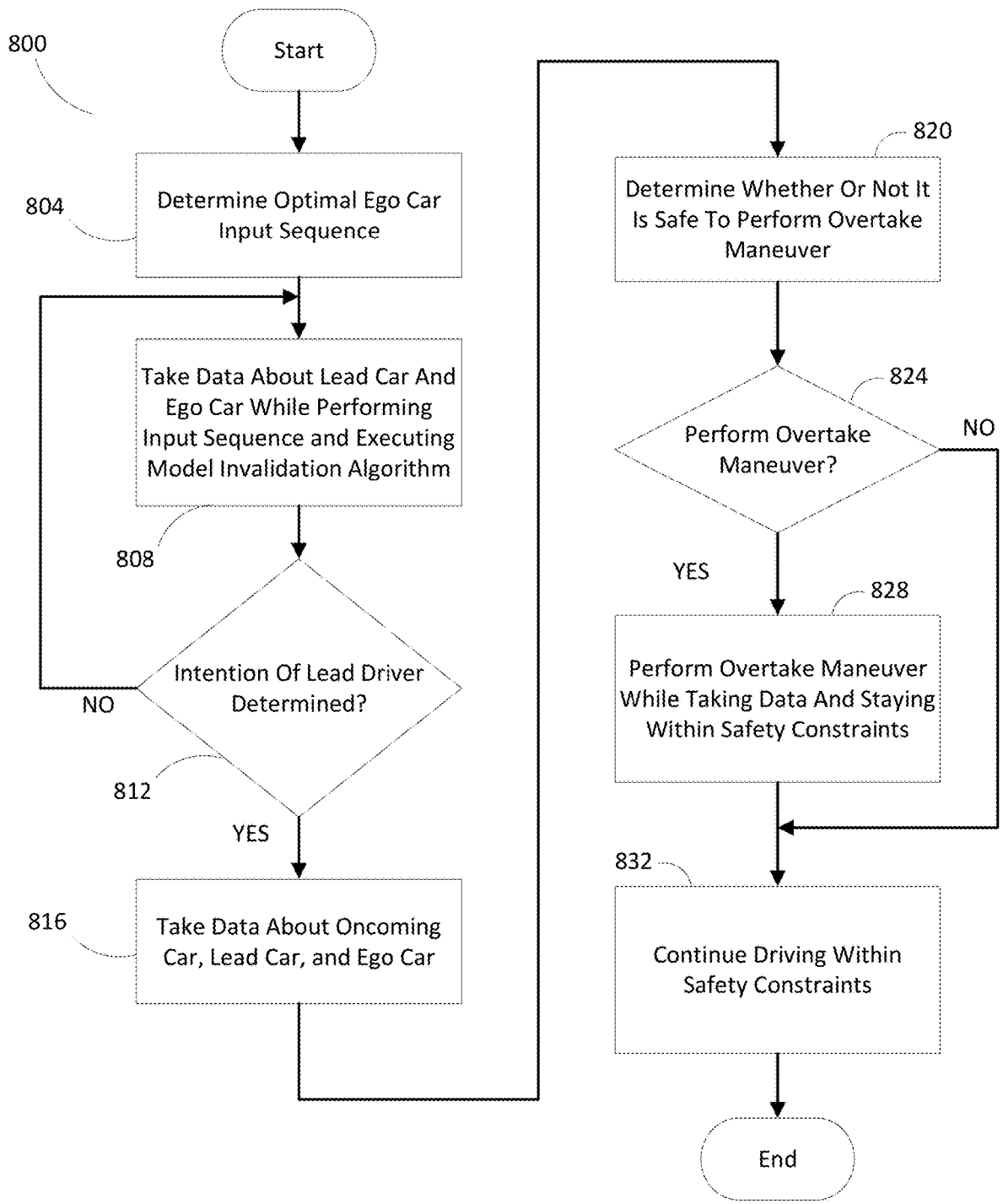

SAFE AUTONOMOUS OVERTAKING WITH INTENTION ESTIMATION

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to the overtaking of a lead vehicle by an autonomous ego vehicle, and in particular, to the overtaking of a lead vehicle by an autonomous ego vehicle on a two-lane road in the presence of an oncoming vehicle.

2. Description of the Related Art

Autonomous vehicles have been a very active topic of research recently due to numerous potential benefits such as driver comfort, reduced road fatalities, improved mobility, etc., and various aspects of them such as perception, real-time decision making and motion planning have been extensively studied (see, e.g., the review disclosures Ref. (1-4) for more details). In particular, safely overtaking a slower vehicle moving on a two-lane road is of interest.

Autonomous overtaking has been studied using various strategies in the literature. The authors in Ref. (5) use model predictive control (MPC) for generating overtaking trajectories in the presence of an oncoming vehicle, while a hierarchical planning approach including strategic-level and low-level trajectory optimization for lane changing is presented in Ref. (6). Receding horizon control has also been used to deal with lane changing problems, where the surrounding vehicles are modeled as Markov Gaussian Processes in Ref. (7), and stochastic MPC is employed to account for the uncertainty in other vehicles' motion. Similarly, the approach in Ref. (8) samples independent and identically distributed (i.i.d.) prediction trajectories of other vehicles from a generic model and build multi-level optimization problems based on these independent and identically distributed (i.i.d.) scenario samples. Other approaches use multi-policy decision making for high-level lane-changing behavior, where buffered Voronoi cells were used to compute a geometric partition and then, reducing the safety control design to ensuring that the vehicles avoid the partition boundaries Ref. (9). However, these works do not consider the reaction of the other vehicles to the ego vehicle's overtaking maneuver.

Another set of relevant literature pertains to approaches for active model discrimination, which injects a small input signal that causes the behaviors of all models to be distinct, thus can be discriminated from each other; see Ref. (10) and Ref. (11). These approaches have been successfully adopted for intention estimation in Ref. (12), Ref. (13). In Ref. (12), an active model discrimination approach was proposed by solving an mixed-integer linear program (MILP) and applied to the problem of intention identification of other autonomous vehicle or human drivers in scenarios of intersection crossing and lane changing, while in Ref. (13), an affine abstraction-based separating input design problem was studied for a set of uncertain nonlinear models and used in an intention estimation example of a highway lane changing scenario with Dubins vehicle models.

Therefore, what is needed is an improved method system for the overtaking of a lead vehicle by an autonomous ego vehicle.

SUMMARY OF THE INVENTION

The present disclosure provides a method of overtaking a lead vehicle using an estimated intention of the lead vehicle.

In one aspect, the present disclosure provides a method in a data processing system that includes at least one processor and at least one memory. The at least one memory includes instructions executed by the at least one processor to implement a vehicle overtaking system. The method includes causing a vehicle control system in an ego vehicle to execute at least a portion of an input control sequence, receiving, from a first plurality of sensors coupled to the ego vehicle, lead vehicle data about a lead vehicle, estimating an intention of the lead vehicle based on the lead vehicle data, and causing the vehicle control system to perform a vehicle maneuver based on the intention of the lead vehicle.

The method may further include receiving, from a second plurality of sensors coupled to the ego vehicle, oncoming vehicle data about an oncoming vehicle, and receiving, from a third plurality of sensors coupled to the ego vehicle, ego vehicle data about the ego vehicle.

In the method, at least one sensor of the first plurality of sensors may belong to the second plurality of sensors and the third plurality of sensors.

In the method, the input control sequence may include a plurality of discrete time points and at least a portion of the ego vehicle data, lead vehicle data, and the oncoming vehicle data may be associated with one of the discrete time points.

In the method, the vehicle maneuver may include determining the ego vehicle is unable to overtake the lead vehicle while keeping the ego vehicle within a predetermined set of safety constraints based on at least one of the ego vehicle data, lead vehicle data, oncoming vehicle data, or the estimated intention of the lead vehicle, piloting the ego vehicle to follow behind the lead vehicle within the predetermined set of safety constraints. The predetermined set of safety constraints may include a predetermined headway separation distance between the ego vehicle and the lead vehicle.

In the method, the vehicle maneuver may include determining the ego vehicle is able to overtake the lead vehicle while keeping the ego vehicle within a predetermined set of safety constraints based on at least one of the ego vehicle data, lead vehicle data, oncoming vehicle data, or the estimated intention of the lead vehicle, and piloting the ego vehicle along a trajectory to overtake the lead vehicle within the predetermined set of safety constraints. The method may further include calculating a trajectory based on an ego vehicle speed, a lead vehicle speed, an ego vehicle location, and a lead vehicle location, wherein each of the ego vehicle speed, the lead vehicle speed, the ego vehicle location, and the lead vehicle location are based on at least one of the ego vehicle data and the lead vehicle data. In the method, the trajectory may include a desired location located ahead of the lead vehicle determined based on dynamics of the lead vehicle corresponding to the determined intention. In the method, the determining the ego vehicle is able to overtake the lead vehicle while keeping the ego vehicle within the predetermined set of safety constraints may be further based on at least one of an oncoming vehicle speed and an oncoming vehicle location, each of the oncoming vehicle speed and the oncoming vehicle location based on the oncoming vehicle data.

In the method, determining the intention of the lead vehicle may include providing the lead vehicle data to a model selection algorithm, receiving an output of the model selection algorithm, determining a most likely intention of the lead vehicle based on the output of the model selection algorithm. The lead vehicle data may include a lead vehicle speed.

In another aspect, the present disclosure provides a driving control system for an ego vehicle. The driving control system includes a first plurality of sensors coupled to the ego vehicle and a controller in electrical communication with the first plurality of sensors. The controller may be configured to execute a program stored in the controller to cause a vehicle control system in the ego vehicle to execute at least a portion of an input control sequence, receive, from a first plurality of sensors coupled to the ego vehicle, lead vehicle data about a lead vehicle, estimate an intention of the lead vehicle based on the lead vehicle data, and cause the vehicle control system to perform a vehicle maneuver based on the intention of the lead vehicle.

The system may include a second plurality of sensors coupled to the ego vehicle, and a third plurality of sensors coupled to the ego vehicle. The controller may be further configured to receive, from the second plurality of sensors coupled to the ego vehicle, oncoming vehicle data about an oncoming vehicle, and receive, from the third plurality of sensors coupled to the ego vehicle, ego vehicle data about the ego vehicle.

In the system, at least one sensor of the first plurality of sensors may belong to the second plurality of sensors and the third plurality of sensors.

In the system, the input control sequence may include a plurality of discrete time points and at least a portion of the ego vehicle data, lead vehicle data, and the oncoming vehicle data may be associated with one of the discrete time points.

In the system, the vehicle maneuver may include additional steps in the program and the controller may be further configured to determine if the ego vehicle is unable to overtake the lead vehicle while keeping the ego vehicle within a predetermined set of safety constraints based at least one of the ego vehicle data, lead vehicle data, oncoming vehicle data, or the estimated intention of the lead vehicle, and pilot the ego vehicle to follow behind the lead vehicle within the predetermined set of safety constraints. The predetermined set of safety constraints may include a predetermined headway separation distance between the ego vehicle and the lead vehicle.

In the system, the vehicle maneuver may include additional steps in the program. The controller may be further configured to determine the ego vehicle is able to overtake the lead vehicle while keeping the ego vehicle within a predetermined set of safety constraints based on at least one of the ego vehicle data, lead vehicle data, oncoming vehicle data, or the estimated intention of the lead vehicle, and pilot the ego vehicle along a trajectory to overtake the lead vehicle within the predetermined set of safety constraints. The ego vehicle data may include an ego vehicle speed and an ego vehicle location, the lead vehicle data comprises a lead vehicle speed and a lead vehicle location, and the method may further include calculating a trajectory that is determined based on the ego vehicle speed, the lead vehicle speed, the ego vehicle location, and the lead vehicle location, and the trajectory includes a desired location located ahead of the lead vehicle determined based on dynamics of the lead vehicle corresponding to the determined intention.

These and other features, aspects, and advantages of the present invention will become better understood upon consideration of the following detailed description, drawings and appended claims.

BRIEF DESCRIPTION OF THE DRAWINGS

FIG. 8 shows an exemplary embodiment of a process for implementing an overtaking with an intention estimation algorithm.

DETAILED DESCRIPTION OF THE INVENTION

Elements of this disclosure could provide new consumer protections by allowing a semi-autonomous or autonomous ego vehicle to more safely and effectively overtake a lead vehicle in the presence of an oncoming vehicle.

In this disclosure, we propose a safe, autonomous overtaking algorithm for an ego vehicle that accounts for the intentions of a lead vehicle. The intention estimation algorithm consists of two phases: (1) an offline phase where an optimal control input sequence for the ego vehicle over a finite time horizon is found to distinguish the intentions of the lead vehicle, and (2) an online phase where the computed sequence is applied to actively distinguish and find out the intention of the lead vehicle. This intention is then used to generate an overtaking trajectory for the ego vehicle, based on vector field guidance. Some contributions of this disclosure are:

(1) the generalization of the active model discrimination formulation to allow piece-wise state-dependent constraints on the controlled inputs, making it applicable to a more general class of affine models when compared to those in Ref. (12), Ref. (13), and (2) an intent-aware, finite-time tracking controller for overtaking the lead vehicle, based on a novel vector field guidance approach that uses super-elliptic contours and safely guides the ego vehicle around the lead vehicle. The rest of the disclosure is organized as follows: The Modeling and Problem Statement section provides the mathematical modeling. The intent estimation and trajectory generation and control algorithms are discussed in the Intention Estimation of The Lead Vehicle, and Trajectory Generation and Control for the Ego Vehicle sections, respectively. Simulation results are provided below.

Modeling and Problem Statement

Notations:

The set of positive integers up to n is denoted by $\mathbb{Z}_n^+$, and the set of non-negative integers up to n is denoted by $\mathbb{Z}_n^0$. Vectors are denoted in bold letters (r). $\|\cdot\|$ is the 2-norm and $\|\cdot\|_\infty$ is the infinity vector norm.

A. Vehicle Dynamics

Figure 1:
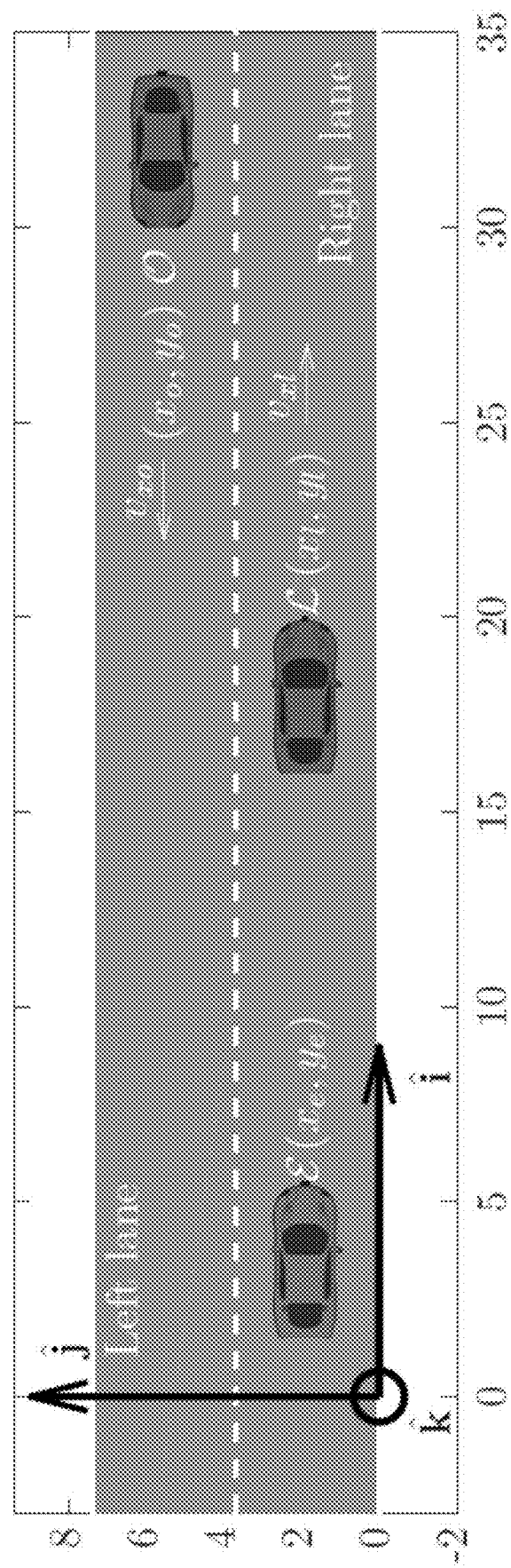
FIG. 1 shows a coordinate frame of an ego vehicle, a lead vehicle, and an oncoming vehicle.

We consider a two-lane road $\mathcal{R} \subseteq \mathbb{R}^2$ of lane width $y_{lane}$, and 3 vehicles: an ego vehicle, $\varepsilon$, a lead vehicle, $\mathcal{L}$ and an oncoming vehicle, O. All vehicles are identical in shape and are rectangular with length $l_c$ and width $w_c(<y_{lane})$. The vehicles are assumed to have the following dynamics:

$$\dot{r}_j = \begin{bmatrix} \dot{x}_j \\ \dot{y}_j \end{bmatrix} = \begin{bmatrix} v_{xj} \\ v_{yj} \end{bmatrix} = v_j, \; \dot{v}_{xj} = u_{xj} - C_d v_{xj}, \quad (1)$$

for $j \in \{e,l,o\}$. $r_j = [x_j \; y_j]^T$, for $j \in \{e,l,o\}$, are the position vectors of $\varepsilon$, $\mathcal{L}$ and O, respectively, in the X-Y plane with respect to (w.r.t.) a global inertial frame $\mathcal{F}_g(\hat{i},\hat{j},\hat{k})$ fixed on the outer edge of the rightmost lane as shown in FIG. 1; $v_{xk}$ are longitudinal velocities; $u_{xj}$ and $v_{yj}$ are longitudinal acceleration inputs and lateral velocity inputs, respectively, which are bounded as:

$$|u_{xj}| \leq u_j^{max}, |v_{yj}| \leq v_j^{max}, \quad (2)$$

where $j = \{e,l,o\}$ and $C_d$ is the coefficient of drag. Since overtaking requires more control authority for $\varepsilon$, we assume a larger control bound on $\varepsilon$ while overtaking:

$$|u_{xe}| \leq u_e^{max,over} \quad (3)$$

This can be interpreted as that $\varepsilon$ will not fully utilize its control authority in normal driving, but in overtaking, it will leverage that to accomplish the task.

The vehicles are modeled as rectangles with their edges aligned with the axes $\mathcal{F}_g$, defined as:

$$\varepsilon = \left\{ r \in \mathbb{R}^2 \mid |x - x_e| \leq \frac{l_c}{2}, |y - y_e| \leq \frac{w_c}{2} \right\}, \quad (4)$$

$$\mathcal{L} = \left\{ r \in \mathbb{R}^2 \mid |x - x_l| \leq \frac{l_c}{2}, |y - y_l| \leq \frac{w_c}{2} \right\},$$

$$O = \left\{ r \in \mathbb{R}^2 \mid |x - x_o| \leq \frac{l_c}{2}, |y - y_o| \leq \frac{w_c}{2} \right\},$$

For simplicity, we assume that O is moving with a constant speed $v_{xo}$ on the left lane in the opposite direction.

Intention Models of the Lead Vehicle $\mathcal{L}$

During the intention estimation phase, we assume that $\varepsilon$ is behind $\mathcal{L}$ in the same lane and the headway $h(k) = x_l(k) - x_e(k)$ between $\mathcal{L}$ and $\varepsilon$ satisfies $h(k) > h_{min} > 0$ to avoid collision and ensure safety. We also limit our intention estimation problem to the case where $\mathcal{L}$ has a constant lateral position and its longitudinal velocity under different driving behaviors does not saturate in the process of intention estimation. Specifically, we consider two driver intentions $i \in \{A, C\}$ for $\mathcal{L}$, corresponding to Annoying and Cautious drivers, which are modeled as:

$$u_{xl,i} = \begin{cases} u_{xl,0} + K_{i,1}\Delta y + K_{i,2}\Delta h_i + \delta_i, & h_{min} < h < h_{max} \\ u_{xl,0}, & \text{otherwise} \end{cases}, \quad (5)$$

where $\Delta y = y_e - y_l$, $\Delta h_A = h_{max} - h$, $\Delta h_C = h$, $K_{i,1}$ and $K_{i,2}$ are constants and $\delta_i$ is an input uncertainty accounting for nonlinear non-deterministic driving behavior. $u_{xl,0} = -K_0(v_{xl} - v_{xl}^{des}) + C_d v_{xl}^{des}$ is a baseline controller that represents the default lead vehicle $\mathcal{L}$ behavior to maintain a desired speed $v_{xl}^{des}$. We choose $K_{A,1} > 0$ and $K_{A,2} > 0$ in (5) such that the annoying driver drives aggressively and speeds up when $\varepsilon$ tries to overtake $\mathcal{L}$, while $K_{C,1} < 0$ and $K_{C,2} < 0$ for the cautious driver who slows down and makes it easier for $\varepsilon$ to overtake $\mathcal{L}$.

The problem of autonomously overtaking a lead vehicle $\mathcal{L}$ in the presence of an oncoming vehicle O on the left lane is a hard task when there is no knowledge on how $\mathcal{L}$ is going to behave. Since the knowledge of $\mathcal{L}$'s intention would be beneficial in motion planning, we propose to split the overall overtaking problem into two sequential sub-problems: (1) Intent estimation of $\mathcal{L}$ based on the intent models (5), and (2) Overtaking control for $\varepsilon$ given the intention of $\mathcal{L}$. Formally, the sub-problems are:

Problem 1: Estimate the intention of $\mathcal{L}$ over a fixed time horizon T. This includes the following two parts:

Active model discrimination: Find an optimal ego vehicle's input sequence $u_T^* = (u_e^*(0), \ldots, u_e^*(T-1))$ (with zero-order hold) over a finite horizon T offline such that the observed trajectory of $\mathcal{L}$ is only consistent with one intention model regardless of any realization of uncertainties.

Model selection: Implement the obtained optimal input sequence alongside a model selection algorithm in real-time to identify the intention of $\mathcal{L}$ based on its observed output trajectories.

Problem 2: Find a control input $u_e = [u_{xe} \; v_{ye}]^T$ for the ego vehicle $\varepsilon$ to overtake the lead vehicle $\mathcal{L}$ safely in the presence of the oncoming vehicle O based on the estimated intention from Problem 1.

Intention Estimation of the Lead Vehicle

In this section, we design an optimal $\varepsilon$'s input sequence and an intention estimation algorithm to distinguish the two intentions of $\mathcal{L}$. The following time-discretized model for $\mathcal{L}$ and $\varepsilon$ is used in this section:

$$v_{xe}(k+1) = (1 - C_d\delta t)v_{xe}(k) + u_{xe}(k)\delta t \quad (6a)$$

$$y_e(k+1) = y_e(k) + v_{ye}(k)\delta t \quad (6b)$$

$$h(k+1) = h(k) - v_{xe}(k)\delta t + v_{xl}(k)\delta t \quad (6c)$$

$$v_{xl}(k+1) = (1 - C_d\delta t)v_{xl}(k) + u_{xl}(k)\delta t \quad (6d)$$

where $h(k) = x_l(k) - x_e(k)$ is the headway between $\mathcal{L}$ and $\varepsilon$ and $\delta t$ is the sampling time. The output of the discrete time model is $\mathcal{L}$'s velocity, i.e. $z(k) = v_{xl}(k)$. Note that the separating input $u_e = [u_{xe} \; v_{ye}]^T$ is equal for both intention models.

Vehicle Dynamics with Different Intentions

The discrete-time state-space models $\mathcal{G}_i$, $i \in \{A, C\}$, for both the annoying vehicle and cautious vehicle, are given by $$\vec{x}_i(k+1) = A_i\vec{x}_i(k) + B_i u_e(k) + B_{\delta,i}\delta_i(k) + f_i, \quad (7)$$

$$z_i(k) = C_i \vec{x}_i(k), \quad (8)$$

where $\vec{x}(k)=[v_{xe,i}(k)\ y_{e,i}(k)\ h_i(k)\ v_{xl,i}(k)]^T$, $z_i(k)=v_{xl,i}(k)$, and the system matrices are $$A_i = \begin{bmatrix} 1-C_d\delta t & 0 & 0 & 0 \\ 0 & 1 & 0 & 0 \\ -\delta t & 0 & 1 & \delta t \\ 0 & K_{i,1}\delta t & \bar{a}_i K_{i,2}\delta t & 1-(K_0+C_d)\delta t \end{bmatrix},$$

$$B_i = \begin{bmatrix} \delta t & 0 \\ 0 & \delta t0 \\ 0 & 0 \\ 0 & 0 \end{bmatrix}, B_{\delta,i} = \begin{bmatrix} 0 \\ 0 \\ 0 \\ \delta t \end{bmatrix},$$

$$f_i = \begin{bmatrix} 0 \\ 0 \\ 0 \\ (K_0+C_d)v_{xl}^{des}\delta t + \bar{f}_i \end{bmatrix}, C_i = [0\ 0\ 0\ 1],$$

where $\bar{a}_i$ and $\bar{f}_i$ are defined as $$\bar{a}_i = \begin{cases} -1, i=A \\ 1, i=C \end{cases}, \text{ and } \bar{f}_i = \begin{cases} K_{A,2}h_{max}\delta t, i=A \\ 0, i=C \end{cases}$$

For both vehicle models $\mathcal{G}_i$, $i \in \{A, C\}$, we assume that the initial condition for model i, denoted by $\vec{x}_i^0 = \vec{x}_i(0)$, is constrained to a polyhedral set defined as:

$$\vec{x}_i^0 \in \chi_0 = \{\vec{x} \in \mathbb{R}^4 : P_0\vec{x} \le p_0\}, \forall i \in \{A,C\} \quad (9)$$

The constraints on controlled input $u_e$ defined in (2) are equivalently written as the following polyhedral set (for $k \in \mathbb{Z}_{T-1}^0$):

$$u_e(k) \in \mathcal{U} = \{u_e \in \mathbb{R}^2 : Q_u u_e \le q_u\} \quad (10)$$

In addition, the uncertainty $\delta_i$ is also contained to a polyhedral set (for $k \in \mathbb{Z}_{T-1}^0$) defined as $$\delta_i(k) \in \mathcal{D}_i = \{\delta \in \mathbb{R} : Q_{\delta,i}\delta \le q_{\delta,i}\} \quad (11)$$

The states $\vec{x}_i(k)$ are divided into controlled state $x_i(k)=[v_{xe,i}(k)\ y_{e,i}(k)\ h_i(k)]^T \in \mathbb{R}^3$ and uncontrolled state $y_i(k)=v_{xl,i}(k) \in \mathbb{R}$. The controlled state $x_i(k)$ are constrained to the following polyhedral set (for $k \in \mathbb{Z}_T^+$):

$$x_i(k) \in \chi_{x,i} = \{x \in \mathbb{R}^3 : P_{x,i}x \le p_{x,i}\}. \quad (12)$$

Figure 2:
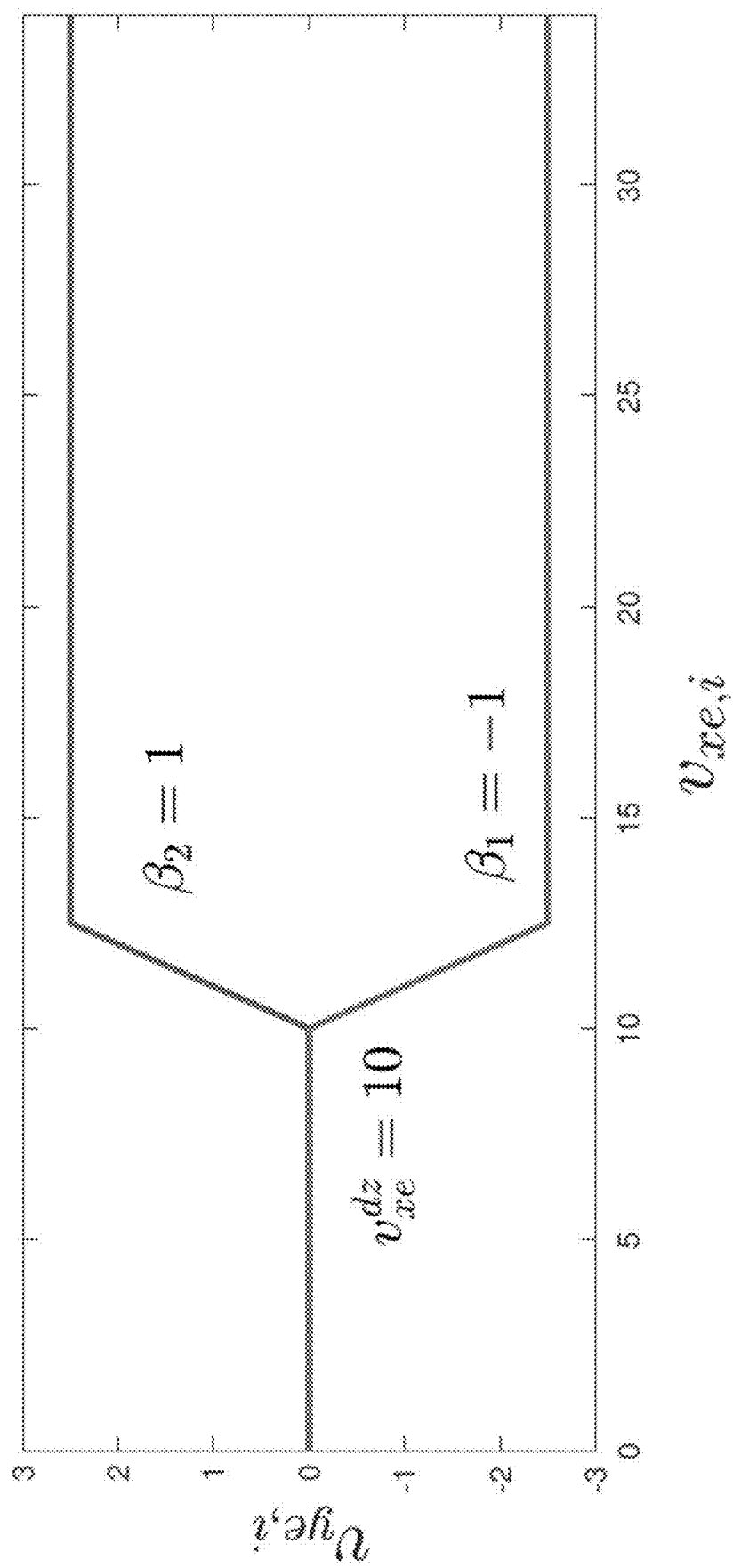
FIG. 2 shows a piece-wise state-dependent constraint on an ego vehicle's lateral input.

Moreover, we require $\mathcal{L}$ and $\varepsilon$ to keep a minimum distance to avoid collision during the intention estimation process. This safety constraint is given by $$h_i(k) \in \mathcal{H}_i = \{h \in \mathbb{R} : h \ge h_{min}\} \quad (13)$$

where $h_{min} > 0$. In addition, we constrain $\varepsilon$ longitudinal velocity to an interval with $v_{ex,i} \in [v_e^{min}, v_e^{max}]$, and $\varepsilon$'s lateral velocity input has to satisfy a piece-wise state-dependent constraint defined as $$v_{ye,i} \in \quad (14)$$
$$\begin{cases} \{0\}, v_e^{min} \le v_{xe,i} \le v_{xe}^{dz}, \\ \{v_{ye,i} : \beta_1(v_{xe,i}-v_{xe}^{dz}) \le v_{ye,i} \le \beta_2(v_{xe,i}-v_{xe}^{dz})\}, v_{xe}^{dz} \le v_{xe,i} \le v_e^{max} \end{cases}$$

where $v_{xe}^{dz}$ can be considered as a dead-zone, within which $\varepsilon$ does not have lateral motion, while $\beta_1$ and $\beta_2$ are slopes that mimic curvature constraints of real vehicles. The constraint in (14) implies that $\varepsilon$ is allowed to overtake $\mathcal{L}$ only when its longitudinal velocity is greater than $v_{xe}^{dz}$. An example of the piece-wise state-dependent constraint with $v_{xe}^{db}=10$, $\beta_1=-1$, $\beta_2=1$ is shown in FIG. 2.

Remark 1: We assume that the intention models are well-posed, whose definition can be found in Ref. (12, Remark 1). Vehicle dynamic models are impractical if they are not well-posed, since the responsibilities of the inputs will be impossible to be satisfied; thus, we shall assume throughout the disclosure that vehicle models with different intentions are always well-posed. Now, the offline active model discrimination problem in Problem 1 can be formally redefined as follows:

Problem 3: Given two intention models $\mathcal{G}_i$, $i \in \{A, C\}$, and state, input and uncertainty constraints, (9)-(14), find an optimal input sequence $u_T^* = \{u_e^*(0), \ldots, u_e^*(T-1)\}$ over a finite horizon T to minimize a given cost function $\|u_T\|_\infty$ that ensures comfort (with small maximum input amplitudes) such that for all possible initial states $\vec{x}_i(0)$ and uncertainty $\delta_i(k)$, $\forall k \in \mathbb{Z}_T^0$, only one model is valid, i.e., the output trajectories of the intention models $\mathcal{G}_i$ over a finite horizon T have to differ by a separation threshold $\epsilon$ in at least one time instance. The optimization problem can be formally stated as:

$$\min_{u_T, x_{i,T}} \|u_T\|_\infty \text{ s.t.} \forall k \in \mathbb{Z}_{T-1}^0 : (10) \text{ holds}, \quad (15a)$$

$$\forall i \in \{A, C\} \forall k \in \mathbb{Z}_T^+ : (14) \text{ holds}, \quad (15b)$$

$$\left.\begin{array}{l}\forall i, j \in \{A, C\}, i \ne j, \\ \forall k \in \mathbb{Z}_T^0, \forall \vec{x}_i^0, y_i(k), \delta_i(k): \\ (7), (9), (11) \text{ hold}\end{array}\right\} : \forall k \in \mathbb{Z}_T^+ : (12), (13) \text{ hold}, \quad (15c)$$

$$\left.\begin{array}{l}\forall i, j \in \{A, C\}, i \ne j, \\ \forall k \in \mathbb{Z}_T^0, \forall \vec{x}_i^0, y_i(k), \delta_i(k): \\ (7)-(8), (11)-(13) \text{ hold}\end{array}\right\} \exists k \in \mathbb{Z}_T^0 : |z_i(k)-z_j(k)| \ge \epsilon, \quad (15d)$$

where $x_{i,T} = \{x_i(0), \ldots, x_i(T)\}$ with $i \in \{A, C\}$.

Intention Estimation Approach

To solve Problem 1, an optimization-based approach is proposed, consisting of an offline active model discrimination algorithm and an online model selection algorithm. For brevity, we only give the main results of the approach, and its proofs are omitted as they follow similar steps that can be found in Ref. (12).

Proposition 1 (Active Model Discrimination): Given any separation threshold, the active model discrimination problem in Problem 3 is equivalent to a bilevel optimization problem with the following outer problem:

$$\min_{u_T} \|u_T\|_\infty \quad (P_{outer})$$

$$\text{s.t.} \forall k \in \mathbb{Z}_{T-1}^0 : (10) \text{ holds}, \quad (16a)$$

$$\forall i \in \{A, C\} \forall k \in \mathbb{Z}_T^+ : (14) \text{ holds}, \quad (16b)$$

-continued $$\left.\begin{array}{l}\forall\, i,j\in\{A,C\},\, i\neq j,\\ \forall\, k\in\mathbb{Z}_T^0,\, \forall\, \vec{x}_i^0,\, y_i(k),\delta_i(k):\\ (7),(9),(11)\text{ hold}\end{array}\right\}\forall\, k\in\mathbb{Z}_T^+\colon (12),(13)\text{ hold},\quad (16c)$$

$$\delta^*(u_T)\geq \epsilon, \quad (16d)$$

where $\delta^*(u_T)$ is the solution to the inner problem:

$$\delta^*(u_T)=\min_{\delta,\vec{x}_i^0,\delta_i,T}\delta \quad (P_{inner})$$

s.t. $\forall\, i\in\{A,C\},\, \forall\, k\in\mathbb{Z}_{T-1}^0\colon$ (7) holds, (17a)

s.t. $\forall\, i\in\{A,C\},\, \forall\, k\in\mathbb{Z}_T^+\colon$ (8) holds, (17b)

$$\left.\begin{array}{l}\forall\, i,j\in\{A,C\},\, i\neq j,\\ \forall\, k\in\mathbb{Z}_T^0\end{array}\right\}\colon |z_i(k)-z_j(k)|\leq \delta \quad (17c)$$

$$\left.\begin{array}{l}\forall\, i,j\in\{A,C\},\, \forall\, k\in\mathbb{Z}_T^0,\\ \forall\, \vec{x}_i^0,\, y_i(k),\delta_i(k)\end{array}\right\}\colon (9),(11)\text{ hold} \quad (17d)$$

where $\delta_{i,T}=\{\delta_i(0),\ldots,\delta_i(T)\}$ with $\in\{A,C\}$.

Based on the bilevel problem proposed in Proposition 1, we can further leverage Karush-Kuhn-Tucker (KKT) conditions to convert the bi-level problem into a single level MILP problem, which can be solved by off-the-shelf optimization software, such as Gurobi Ref. (14) and CPLEX Ref. (15). These details can be found in our previous disclosure Ref. (12, Theorem 1). Comparing with Ref. (12), we consider additional piece-wise state-dependent constraints and responsibilities on the controlled input in the outer problem of this disclosure, in order to make the intention estimation problem more realistic and practical. In addition, to estimate the intention of $\mathcal{L}$, the optimal separating input is applied in real-time and the following model selection problem is considered:

Proposition 2 (Model Selection): Given two vehicle model $\mathcal{G}_i$, $i\in\{A,C\}$, and an input-output sequence $\{u_e(k), z_m(k)\}_{k=0}^T$, where $u_e(k)$ is obtained in Proposition 1, the model selection problem in Problem 1 is equivalent to the following feasibility problem:

Find $\vec{x}(k),\delta(k),i,\forall k\in\mathbb{Z}_{T-1}^0$ s.t. $i\in\{A,C\},\forall k\in\mathbb{Z}_T^0\colon z_m(k)-z_i(k)=0,$ (18a)

$\forall k\in\mathbb{Z}_{T-1}^0\colon (7)$ holds, (18b)

$\forall k\in\mathbb{Z}_{T-1}^0\colon (9)-(11)$ hold, (18c)

$\forall k\in\mathbb{Z}_T^+\colon (12)-(14)$ hold. (18d)

We can solve the above feasibility check problem by leveraging the model invalidation algorithm in Ref. (16) and identify the true intention, which is guaranteed since the separating input in Proposition 1 is applied.

Trajectory Generation and Control for the Ego Vehicle

In this section, we provide a solution to Problem 2, i.e., we design the $\mathcal{L}$ control actions $u_{xe}(t)$ and $v_{ye}(t)$ of $\varepsilon$ so that it safely overtakes $\mathcal{L}$ at some finite time $T<\infty$. To assess the safety of the vehicles, we define a weighted $\infty$-norm distance between two rectangular vehicles i,j as:

$$\|r_i-r_j\|_\infty = \max\left(\left|\frac{x_i-x_j}{l_c}\right|,\left|\frac{y_i-y_j}{w_c}\right|\right), \quad (19)$$

where $l_c$ and $w_c$ are the dimensions of the rectangles. The distance is referred to as $\infty$-distance hereafter.

Definition 1 (Safety): Two vehicles i and j are safe with regards to each other if $\|r_i(t)-r_j(t)\|_\infty>1, \forall t>t_0$.

To ensure the safety of the ego vehicle $\varepsilon$ from the lead vehicle $\mathcal{L}$, we inflate $\mathcal{L}$ as $$\bar{\mathcal{L}}=\left\{r\in\mathbb{R}^2\,\Big|\,|x-x_l|\leq\frac{\bar{l}_c}{2},|y-y_l|\leq\frac{\bar{w}_c}{2}\right\},\text{ where}$$

$$\bar{l}_c=l_c+2(x_{safe}),\bar{w}_c=w_c+2(y_{safe}),\text{ and }x_{safe}\geq\frac{l_c}{2},y_{safe}\geq\frac{w_c}{2}$$

are safety parameters. Further, let $$R_l=\left\{y\in\mathbb{R}\,\Big|\,\frac{w_c}{2}\leq y\leq y_{lane}-\frac{w_c}{2}\right\}.$$

Definition 2 (Safe overtake): A maneuver and the resulting trajectory $r_e(t;\,t_0,\,r_e(t_0))$ for $\varepsilon$ where the initial position of $\varepsilon$ is behind $\mathcal{L}$ on the same lane (i.e., $x_e(t_0)<x(t_0)$ and $y_e(t_0),y_l(t_0)\in R_l$) and its final position is ahead of $\mathcal{L}$ on the same lane (i.e., $x_e(t_f)>x_l(t_f)$ and $y_e(t_f),y_l(t_f)\in R_l$), is a safe overtake if $\varepsilon$ remains safe with regards to $\mathcal{L}$ and O (i.e., $\|r_e(t)-r_l(t)\|_\infty>1$ and $\|r_e(t)-r_l(t)\|_\infty>1,\forall t\in[t_0,\,t_f]$).

Figure 3:
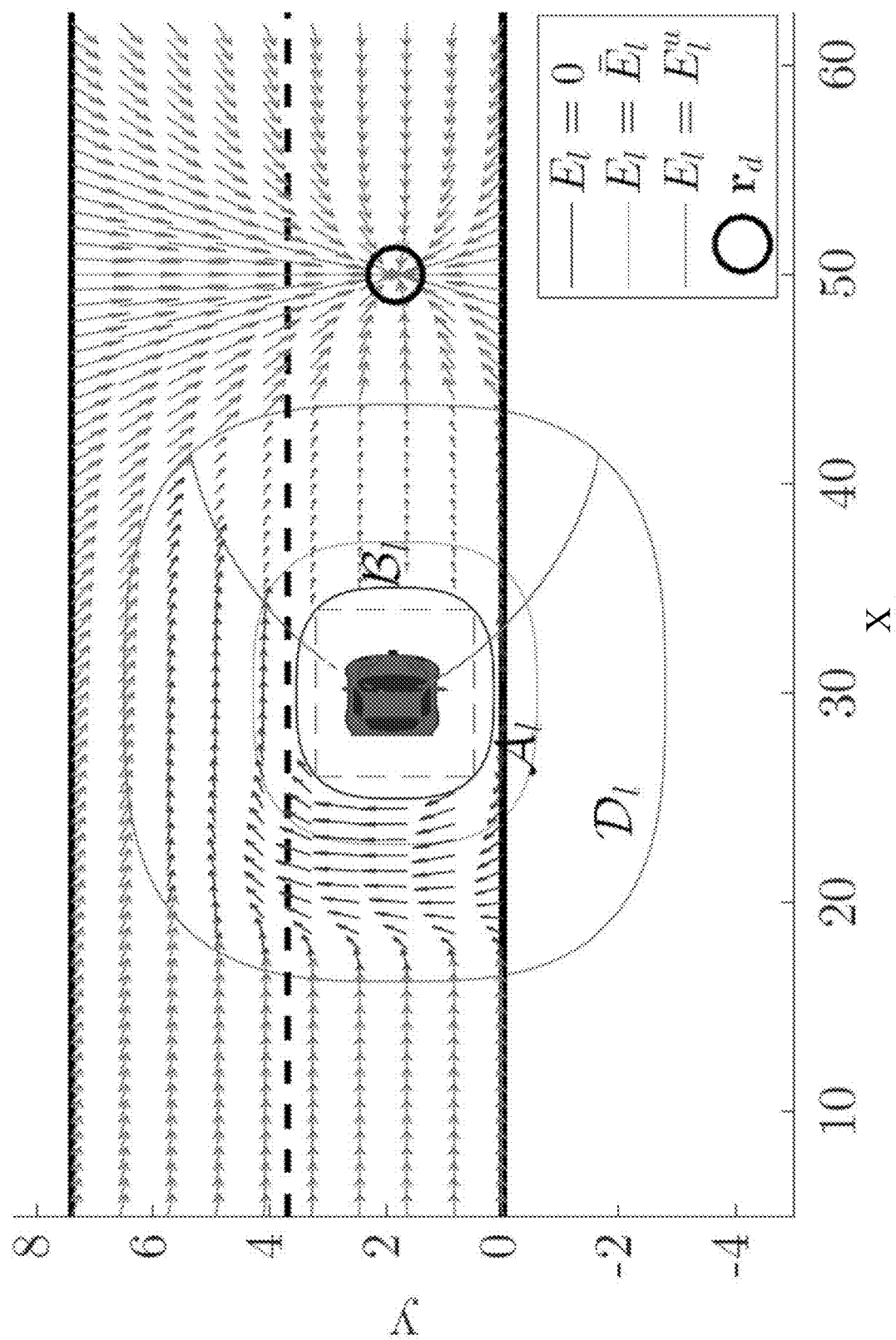
FIG. 3 shows a vector field definition around a vehicle.

To enable safe overtake, we design a finite-time tracking controller based on a safe vector field. First, we choose a desired point $r_d$ ahead of $\mathcal{L}$ that is subject to vehicle dynamics corresponding to the estimated intent from the previous section. Next, we define a vector field F that safely guides $\varepsilon$ around $\bar{\mathcal{L}}$ to $r_d$, and a tracking controller such that $\varepsilon$ tracks the vector field in finite-time. The vector field F is a combination of two vector fields: (1) Guide-away vector field ($F_l$), and (2) Guide-to vector field ($F_d$). The Guide-away vector field $F_l$ is defined to closely follow the rectangular shape of the vehicles using superquadric isopotential contours [17], called E-contours in this disclosure for brevity. The super-elliptic distance from $\bar{\mathcal{L}}$ is defined as:

$$E_l(r)=\left|\frac{x-x_l}{a}\right|^{2n}+\left|\frac{y-y_l}{b}\right|^{2n}-1,\text{ where}\quad (20)$$

$$a=\frac{\bar{l}_c}{2}(2)^{\frac{1}{2n}},\,b=\frac{\bar{w}_c}{2}(2)^{\frac{1}{2n}},\,n>1,$$

and is referred to as E-distance hereafter. For larger values of n, the contours corresponding to a constant value of E-distance $E_l$ tend to be of rectangular shape. FIG. 3 shows three contours for $E_l=0$, $E_l=\bar{E}_l=1.94$ and $E_l=E_l^u=19.43$, with $n=1.5$ and $\bar{\mathcal{L}}$ situated at $[30,1.85]^T$. The inflated lead vehicle $\bar{\mathcal{L}}$ can be approximated by a bounding smallest super-ellipse that contains $\bar{\mathcal{L}}\colon\bar{\mathcal{L}}^m=\{r\in\mathbb{R}^2\,|\,E_l(r)\leq 0\}$ Then the slope of the tangent to E-contours at a point with position vector $r\in\mathbb{R}^2$ is:

$$\tan(\mathcal{B}_l(r))=-\frac{b^{2n}(x-x_l)|x-x_l|^{2n-2}}{a^{2n}(y-y_l)|y-y_l|^{2n-2}}\quad (21)$$

Let the unit tangent vector at r be $$\hat{t}_l(r) = \begin{bmatrix} \cos(\mathcal{B}_l(r)) \\ \sin(\mathcal{B}_l(r)) \end{bmatrix}$$

Vector Fields for Trajectory Generation

1) Guide-away vector field: The Guide-away vector field $F_l$ around the obstacle $\mathcal{L}$ is defined as:

$$F_l(r) = [\cos(\mathcal{B}'_l(r))\sin(\mathcal{B}'_l(r))]^\top \text{ where} \quad (22)$$

$$\mathcal{B}'_l(r) = \begin{cases} \mathcal{B}'_l(r) - \pi, \, ((r - r_d) \times \hat{t}_l(r)) \cdot \hat{k} > 0, \\ \mathcal{B}_d - \pi, \text{ otherwise} \end{cases} \text{with}$$

$$\mathcal{B}_d = \operatorname{atan}2\left(\frac{y - y_d}{x - x_d}\right).$$

This way, $F_l$ takes the form shown in regions $\mathcal{A}_l = \{r \in \mathbb{R}^2 | 0 < E_l(r) < \overline{E}_l, ((r-r_d) \times \hat{t}_l(r)) \cdot \hat{k} > 0\}$ (see violet vectors in FIG. 3) and $\mathcal{B}_l = \{r \in \mathbb{R}^2 | 0 < E_l(r) < E_l^u, ((r-r_d) \times \hat{t}_l(r)) \cdot \hat{k} \leq 0\}$ (see green vectors in FIG. 3)

2) Guide-to vector field: The Guide-to vector field $F_l$ is defined as a radially converging vector field to the desired location $r_d$:

$$F_d(r) = \frac{r_d - r}{\|r_d - r\|} \quad (23)$$

We set $F_d(r_d) = 0$ so that $F_d$ is defined everywhere.

3) Combining vector fields: In order to combine the Guide-to and Guide-away vector fields smoothly near $\mathcal{L}$, a blending function is defined as:

$$\sigma(E_l) = \begin{cases} 1, \, 0 \leq E_l \leq \overline{E}_l \\ AE_l^3 + BE_l^2 + CE_l + D, \, \overline{E}_l \leq E_l \leq E_l^u \\ 0, \, E_l^u \leq E_l \end{cases} \quad (24)$$

where $\overline{E}_l$, $E_l^u$ are the super-elliptic distances defining the inner and outer boundaries of the blending region $\mathcal{D}_l = \{r \in \mathbb{R}^2 | \overline{E}_l < E_i(r) < E_l^u\}$, and the coefficients A, B, C, D are chosen as:

$$A = \frac{2}{(E_l^u - \overline{E}_l)^3}, B = \frac{-3(E_l^u + \overline{E}_l)}{(E_l^u - \overline{E}_l)^3}, C = \frac{6E_l^u \overline{E}_l}{(E_l^u - \overline{E}_l)^3},$$

$$D = \frac{(E_l^u)^2(E_l^u - 3\overline{E}_l)}{(E_l^u - \overline{E}_l)^3},$$

so that (24) is a $C^1$ function. We choose $$E_l^u = \left(\frac{2y_{lane} - \frac{w_c}{2} - y_l}{b}\right)^{2n} - 1$$

such that $F_l$ is active for $$\frac{w_c}{2} \leq y_e \leq 2y_{lane} - \frac{w_c}{2}.$$

The value of $\overline{E}_l$ is chosen such that $\overline{E}_l < E_l^u$. The maximum distance $x_{rep}^{max}$ from $\varepsilon$ along $\hat{l}$ at which the Guide-away vector field $F_l$ is active is given as $x_{rep}^{max} = a(E_l^u + 1)^{1/2n}$. Then the Guide-to and Guide-away vector fields are blended as:

$$F = (1 - \sigma(E_l))F_d + \sigma(E_l)F_l = [F_x F_y]^\top. \quad (25)$$

A vector field similar to $F_l$ is considered around O when $\varepsilon$ attempts to overtake. However, the decision making and analysis is just based on the vector field around $\mathcal{L}$.

Control Design for the Ego Vehicle

The desired position $r_d$ of $\varepsilon$ is chosen ahead of $\mathcal{L}$, and is assumed to follow dynamics described by:

$$\dot{r}_d = \begin{bmatrix} \dot{x}_d \\ \dot{y}_d \end{bmatrix} = \begin{bmatrix} v_{xd} \\ v_{yd} \end{bmatrix} = v_d, \dot{v}_{xd} = u_{xd} - C_d v_{xd} \quad (26)$$

where $v_{yd} = 0$, $u_{xd} = u_{xl,i0} + \delta_i^{min}$ and $u_{xl,i} = u_{xl,i} - \delta_i$, $i = \{A, C, N\}$; i=N stands for the case when $\varepsilon$ is not estimating the intention of $\mathcal{L}$, which we consider for comparison. In the latter case, $\mathcal{L}$ is assumed to be moving with constant average traffic speed ($v_{tr}^{avg}$), with some uncertainty in its acceleration such that the corresponding input is $u_{xl,N} = C_d v_{tr}^{avg} + \delta_N$, where $\delta_N \in [\delta_N^{min}, \delta_N^{max}]$.

We obtain the dynamics of the motion of $\varepsilon$ and $\mathcal{L}$ relative to a coordinate frame attached on $r_d$. Define $$\tilde{r}_e = r_e - r_d, \tilde{v}_e = v_e - v_d \text{ and } \hat{F} = \frac{F}{\|F\|}.$$

Then the dynamics of $\varepsilon$ and $\mathcal{L}$ expressed in the new frame are:

$$\dot{\tilde{r}}_j = \begin{bmatrix} \dot{x}_j - \dot{x}_d \\ \dot{y}_j - \dot{y}_d \end{bmatrix} = \begin{bmatrix} v_{xk} - v_{xd} \\ v_{yk} - v_{yd} \end{bmatrix} = \tilde{v}_j, \quad (27)$$

for $j \in \{e, l\}$, where $\overline{u}_{xe} = u_{xe} - u_{xd}$ and $\overline{u}_{xl} = u_{xl} - u_{xd} - \delta_i^{max} - \delta_i^{min}$. With this choice, we have that $\mathcal{L}$ is either stationary or moving towards the desired position $r_d$. In the worst case, the maximum value of $\overline{u}_{xl}$ is $\overline{u}_{xl}^{max} = \delta_i^{max} - \delta_i^{min}$. This results in a maximum velocity of $\mathcal{L}$ relative to $r_d$ of $$\overline{v}_{xl}^{max} = \frac{\overline{u}_{xl}^{max}}{C_d}.$$

We design a desired velocity profile for $\varepsilon$ that is safe and convergent to the desired position $r_d$ along F as:

$$v_e^{des} = \begin{bmatrix} v_{xe}^{des} \\ v_{ye}^{des} \end{bmatrix} = \begin{cases} \hat{F} k_r \|\tilde{r}_e\|^{\alpha_r}, \|\tilde{r}_e\| \leq R_e^f, \\ \hat{F} v_e^{over}, \text{ otherwise} \end{cases} \quad (28)$$

-continued $$\dot{\bar{v}}_e^{des} = \begin{cases} \hat{F}k_r\|\bar{r}_e\|^{\alpha_r} + k_r\alpha_r\hat{F}\|\bar{r}_e\|^{\alpha_r-2}(\bar{r}_e^\top \bar{v}_e), \|\bar{r}_e\| \le R_e^f, \\ \hat{F}\bar{v}_e^{over}, \text{ otherwise} \end{cases} \quad (29)$$

where $\bar{v}_e^{over} > 0$ is a constant overtake speed, while $k_r > 0$ and $\alpha_r \in (0,1)$ are chosen such that $v_e^{over} = k_r(R_e^f)^{\alpha_r}$, and $R_e^f$ is the radius around the desired position where the finite-time convergent controller takes over.

We now propose the form of the tracking controllers for the control inputs $u_{xe}$ and $v_{xe}$ of $\varepsilon$. For the lateral velocity $v_{ye}$ of $\varepsilon$, we define the control input as:

$$v_{ye} = \bar{v}_{ye}^{des} + v_{yd} \quad (30)$$

where $\bar{v}_{ye}^{des}$ is the desired relative velocity along the y-axis. The acceleration input $\bar{u}_{xe}$ to track the desired longitudinal velocity $\bar{v}_{xe}^{des}$ is designed as:

$$\bar{u}_{xe} = C_d \bar{v}_{xe}^{des} + \dot{\bar{v}}_{xe}^{des} - k_v \bar{e}_{v_{xe}} |\bar{e}_{v_{xe}}|^{\alpha_v - 1} \quad (31)$$

where $\bar{e}_{v_{xe}} = \bar{v}_{xe} - \bar{v}_{xe}^{des}$. In the global coordinate frame, the acceleration input $u_{xe}$ of $\varepsilon$ is:

$$u_{xe} = \bar{u}_{xe} + u_{xd} \quad (32)$$

Theorem 1: The relative velocity $\bar{v}_{xe}$ converges to the desired relative velocity profile $\bar{v}_{xe}^{des}$ in finite time under the control action $\bar{u}_{xe}$ given by (31).

Proof: Under the control law $\bar{u}_{xe}$ given by (31), the error dynamics is:

$$\dot{\bar{e}}_{v_{xe}} = -k_v \bar{e}_{v_{xe}} |\bar{e}_{v_{xe}}|^{\alpha_v - 1} \quad (33)$$

From Ref. (18, Lemma 1], we obtain that the equilibrium $\bar{e}_{v_{xe}} = \bar{v}_{xe} - \bar{v}_{xe}^{des} = 0$ of (33) is finite-time stable.

The safe initial distance $|\bar{x}_l(t_0)|$ between $\mathcal{L}$ and $r_d$ at the start of the overtake ($t=t_0$) should be such that $\mathcal{L}$ does not come $x_{rep}^{max} + R_e^f$ close to $r_d$ when $\varepsilon$ converges to $r_d$. Since the time of convergence $T_f$ depends on $|\bar{x}_l(t_0)|$, we use an iterative approach to find $|\bar{x}_l(t_0)|$ as follows: Initialize $|\bar{x}_l(t_0)|_0 = x_{rep}^{max} + R_e^f$, then $|\bar{z}_l(t_0)|$ is iteratively updated using:

$$|\bar{x}_l(t_0)|_{m+1} = |\bar{x}_l(t_0)|_m + \left\|\bar{r}_e(t_0 + \Delta t)\|\frac{\bar{v}_{xl}^{max}}{\bar{v}_e^{over}}\right\| \quad (34)$$

where $\bar{v}_{xl}^{max}$ is the worst-case relative velocity, and $$\Delta t = \frac{|\bar{x}_l(t_0)|_j - x_{rep}^{max} - R_e^f}{\bar{v}_{xl}^{max}}.$$

The iterative approach is terminated when $$\|\bar{r}_e(t_0 + \Delta t)\| < y_{lane} - \frac{w_c}{2} - y_d(t_0),$$

where $y_d(t_0) = y_e(t_0)$. This iterative approach is guaranteed to converge if $\bar{v}_{xl}^{max} < \bar{v}_e^{over}$ because after exiting $\mathcal{D}_l$, $\|r_e(t_0 + \Delta t)\|$ is convergent to 0 which is discussed later. After $\varepsilon$ has successfully overtaken $\mathcal{L}$, $\varepsilon$ keeps tracking the desired position $r_d$ that moves with a constant cruise speed $v_e^{cr}$.

Control Constraints

We want to design $\bar{v}_e^{over}$ such that the constraint in (3) is satisfied. Since $|u_{xd}| = |u_{xl,i0} + \delta_i^{min}| \le u_i^{max}$ from (2), $\forall i = \{A, C,$ N\}, we require $\bar{u}_{xe}$ to satisfy $(|\bar{u}_{xe}|) \le u_e^{max,over} - u_l^{max}$, from (32). The overtaking maneuver constitutes of: (i) initially moving under the Guide-to vector field $F_d$ until converging to the desired relative velocity (28), discussed later, (ii) entering the blending region $\mathcal{D}_l$, where $E_l \le E_l \le E_l^u$, and (iii) entering the circular region $\{r_e \in \mathbb{R}^2 | \|r_e - r_d\| \le R_e^f\}$. The ego vehicle has a constant relative speed $\bar{v}_e^{over}$ in the blending region, and the velocity vector $\bar{v}_{xe}$ is aligned with the vector field F before it enters the blending region. Then the acceleration $\bar{u}_{xe}$ is bounded as:

$$\bar{u}_{xe} \le \begin{cases} |C_d \bar{v}_e^{over}| + \frac{k_r \bar{v}_e^{over}}{R_e^f}, \|r_e\| < R_e^f \\ |C_d \bar{v}_e^{over}| + |\bar{v}_{xe}^{des}|, \|r_e\| \ge R_e^f, \bar{E}_i \le E_l \le E_l^u \\ |C_d \bar{v}_e^{over}| + |k_v \bar{e}_{v_{xe0}}^{\alpha_v}|, \text{ otherwise} \end{cases} \quad (35)$$

where $\bar{e}_{v_{xe0}} \le \bar{v}_e^{over}$, since $\varepsilon$ starts approaching $\mathcal{L}$ so it is moving at least as fast as $\mathcal{L}$.

Now, since $\bar{v}_{xe}^{des} = \psi_e \bar{v}_e^{over} \sin \psi \le \bar{v}_e^{over} |\psi_e|$, where $$\psi_e = \tan^{-1}\left(\frac{F_y}{F_x}\right),$$

the problem reduces to finding a bound on $|\psi_e|$ and designing the velocity $\bar{v}_e^{over}$ such that it satisfies the overall control bound $\max(|\bar{u}_{xe}|) + u_l^{max} \le u_e^{max,over}$.

Denote $$\bar{F}_{v1} = \frac{[F_y - F_x]}{F_x^2 + F_y^2}\begin{bmatrix}\frac{\partial F_x}{\partial \bar{x}_e} & \frac{\partial F_x}{\partial \bar{y}_e} \\ \frac{\partial F_y}{\partial \bar{x}_e} & \frac{\partial F_y}{\partial \bar{y}_e}\end{bmatrix}\frac{[F_x F_y]^T}{\sqrt{F_x^2 + F_y^2}} \text{ and}$$

$$\bar{F}_{v2} = \frac{[F_y - F_x]}{F_x^2 + F_y^2}\begin{bmatrix}\frac{\partial F_x}{\partial \bar{x}_l} & \frac{\partial F_x}{\partial \bar{y}_l} \\ \frac{\partial F_y}{\partial \bar{x}_l} & \frac{\partial F_y}{\partial \bar{y}_l}\end{bmatrix}.$$

The turning rate is then given as: $\dot{\psi}_e = \bar{F}_{v1} \bar{v}_e^{over} + \bar{F}_{v2} \dot{\bar{r}}_l \le |\bar{F}_{v1}| \bar{v}_e^{over} + \|\bar{F}_{v2}\|\|\dot{\bar{r}}_l\|$. We consider the following problems:

$$\max_{\bar{r}_l \in D_s, \bar{r}_e} |\bar{F}_{v1}| \text{ s.t. } \bar{E}_l \le E_l(\bar{r}_l, \bar{r}_e) \le E_l^u, \quad (36)$$

$$\max_{\bar{r}_l \in D_s, \bar{r}_e} |\bar{F}_{v2}| \text{ s.t. } \bar{E}_l \le E_l(\bar{r}_l, \bar{r}_e) \le E_l^u,$$

where $D_s = \left\{(\bar{x}_l, \bar{y}_l) \parallel \bar{x}_l \mid \le y_{lane - \frac{w_c}{2}}, \bar{y}_l \in [b_{min}, b_{max}]\right\}$ is a 2-D square region capturing that $\mathcal{L}$ stays in lane and maintains a bounded distance away from $r_d$, and $b_{min}$, $b_{max}$ are the search limits along the x-axis. Due to the non-convexity and non-linearity of these problems, we first search in the discretized 4-D space to obtain a sub-optimal solution $\bar{r}_l^*$ and $\bar{r}_e^*$. We then optimize around the neighborhood $\mathcal{N}(\bar{r}_l^*, \bar{r}_e^*)$ of the sub-optimal solution:

$$\max_{(\bar{r}_l, \bar{r}_e) \in N(\bar{r}_l^*, \bar{r}_e^*)} |\bar{F}_{v1}| \text{ s.t. } \bar{E}_l \leq E_l(\bar{r}_l, \bar{r}_e) \leq \bar{E}_l^u, \bar{r}_l \in D_s \quad (37)$$

$$\max_{(\bar{r}_l, \bar{r}_e) \in N(\bar{r}_l^*, \bar{r}_e^*)} |\bar{F}_{v2}| \text{ s.t. } \bar{E}_l \leq E_l(\bar{r}_l, \bar{r}_e) \leq \bar{E}_l^u, \bar{r}_l \in D_s,$$

Given the solutions $F_{v1}$ and $F_{v2}$ to (37), we design $\bar{v}_e^{over}$ such that the maximum of the $\bar{u}_{xe}$ upper bounds in three phases described above satisfies the requirements:

$$u_l^{max} + \max\left\{\left(C_d + \frac{k_r}{R_e^f}\right)\bar{v}_e^{over},\right.$$

$$\left.(C_d + \|\bar{F}_{v2}\| \, \|\hat{r}_l\|)\bar{v}_e^{over} + |\bar{F}_{v1}^*| \, (\bar{v}_e^{over})^2 \text{ and } (C_d + k_v)\bar{v}_e^{max,over}.\right.$$

Safety and Convergence Analysis

To ensure that the relative velocity $\bar{v}_e$ is aligned with $\bar{v}_e^{des}$ when $\varepsilon$ enters the blending region $\mathcal{D}_I$, the overtaking starts with $\varepsilon$ at $x_e(t_0)$ such that $x_e(t_0) < x_l(t_0) - x_{rep}^{max} - x_c$, where $x_c$ is the maximum bound on the distance that $\varepsilon$ would have traveled along $\hat{\imath}$ relative to $r_d$ before it converges to $\bar{v}_e^{des}$. Integrating (33) yields:

$$\bar{e}_{v_{xe}}(t) = \bar{e}_{v_0}\left(1 - \frac{k_v(1-\alpha_v)t}{|\bar{e}_{v_0}|^{1-\alpha_v}}\right)^{\frac{1}{1-\alpha_v}},$$

where $\bar{e}_{v_0} = \bar{e}_{v_{xe}}(0)$. The error $\bar{e}_{v_{xe}}(t)$ becomes 0 at $$t = t_c = \frac{|\bar{e}_{v_0}|^{1-\alpha_v}}{k_v(1-\alpha_v)}$$

and remains zero thereafter. Since $\bar{v}_{xe} \leq \bar{v}_{xe} \leq \bar{v}_e^{over}$, we have $x_c = t_c \bar{v}_e^{over}$.

Theorem 2: The velocity $\bar{v}_e^{des}$ given by Eq. (28) is safe and convergent to $r_d$ in some finite time $T_f$ if $\forall t < T_f, r_d(t) \notin \mathcal{D}_I$, and $$\min_{r \in S_I} \|r(t) - r_d(t)\| > R_e^f,$$

where $S_I = \{r \in \mathbb{R}^2 | E_I(r) = E_I^u\}$ is the boundary of $\mathcal{D}_I$.

Consider $S_I^- = \{r \in \mathbb{R}^2 | E_I(r) = E_I^u + \epsilon_E\}$ and $S_I^+ = \{r \in \mathbb{R}^2 | E_I(r) = E_I^u - \epsilon_E\}$, with $\epsilon_E > 0$ arbitrarily small. Then:

$$\nabla S_I(r) = \left[\frac{2n}{x - x_l}\left|\frac{x - x_l}{a}\right|^{2n}, \frac{2n}{y - y_l}\left|\frac{y - y_l}{b}\right|^{2n}\right], = \nabla S_I^+(r) = \nabla S_I^-(r).$$

From the definition of F, we have $\nabla S_I^- F = \nabla S_I F_d$, $\nabla S_I F = \nabla S_I F_d$. For $\nabla_I^+ F$, consider following cases:

1) Let $r \in S^+$ s.t. $((r - r_d) \times t_I(r)) \cdot \hat{k} > 0$, then by definition $\nabla S_I F_I = 0$. This implies that $\nabla S_I^- F = (1 - \sigma(E_I)) \nabla S_I^+ F_d$. This gives us $(\nabla S_I^- F)(\nabla S_I^+ F) > 0$, meaning that the integral curves cross the surface $S_I$. Let $\nabla S_I^+ F > 0$, this implies $\nabla S_I F > 0$. This contradicts the fact that the integral curves cross $S_I$. Then $\nabla S_I^+ F < 0$, which means that the integral curves approach the boundary $T_I^- = \{r \in \mathbb{R}^2 | E_I(r) = \bar{E}_I\}$ of $\mathcal{D}_I$. Let $T_I^- = \{r \in \mathbb{R}^2 | E_I$ $(r) = \bar{E}_I + \epsilon_E\}$. We have $\nabla T_I^- F = \nabla S_I^+ F < 0$ and $\nabla T_I F = 0$ because on $T_I$ we have $\sigma(E_I) = 1$. This implies that the integral curves do not cross $T_I$ and keep sliding over $T_I$ until reaching $\mathcal{B}_I$. Since, by definition, the vector field in $\mathcal{B}_I$ points toward $r_d$ that is situated outside $\mathcal{B}_I$, one can show using a similar analysis that the integral curves exit $\mathcal{B}_I$.

2) $((r - r_d) \times t_I(r)) \cdot \hat{k} \leq 0$. By definition, the vector fields $F_I$ and $F_d$ both point towards the desired location, which implies $F = F_d$. Then, using a similar analysis as in the previous case, it can be shown that the integral curves exit the switching surface $S_I$ in this region. This proves that F is safe and so is $\bar{v}_e^{des}$. Now, since the blending region $\mathcal{D}_I$ is finite, the integral curves of F inside $\mathcal{D}_I$ are of finite length. Then, an object moving with nonzero speed along the vector field F exits the blending region $\mathcal{D}_I$ in finite time. Further, we have that outside $\mathcal{D}_I$, the vector field F is convergent to $r_d \notin \mathcal{D}_I$ by definition. Thus, given a non-zero speed and by moving along F, there exists a finite time $T_1$ such that $\|\bar{r}_e\| = R_e^f$. At this instance, $$\hat{r} = \frac{-\bar{r}_e}{\|\bar{r}_e\|}$$

because $\sigma(E_I(r_e)) = 0$. This renders the relative position dynamics as: $\ddot{\bar{r}}_e = -k_r \bar{r}_e \|\bar{r}_e\|^{\alpha_r - 1}$. The equilibrium $r_e = r_d$ of this system is finite-time stable as shown in Ref. (18, Lemma 1). Let $T_2$ be time for $\bar{r}_e(t)$ to converge to 0 with $\bar{r}_e(0) = R_e^f$. Then, $r_e$ converges to $r_d$ in finite time $T_f = T_1 + T_2$ with $\bar{v}_e = \bar{v}_e^{des}$.

Case Study and Simulation Results

We apply our proposed intention estimation approach to the overtaking scenario when $\varepsilon$ is behind $\mathcal{L}$ in the same lane, where the underlying goal is to detect the intention of $\mathcal{L}$. The parameters of $\mathcal{L}$'s intention are shown in Table 1, while the initial conditions and state and input bounds during the intention estimation are given in Table 2. The computed optimal input from Proposition 1 is $$u_e = \begin{bmatrix} 0 & 0 & 0 & 0 \\ 0.7919 & 0.7919 & 0 & 0 \end{bmatrix}.$$

Then, this optimal separating input is implemented in real-time while running the model selection algorithm in Proposition 2 to identify the intention of $\mathcal{L}$.

TABLE 1

| Parameters in intentions (5) | | | | | |
|---|---|---|---|---|---|
| Parameter | Value | Parameter | Value | Parameter | Value |
| $K_{A,1}$ | 0.1 | $K_{C,1}$ | −0.5 | $\delta_A$ | [−0.1, 0.1] |
| $K_{A,2}$ | 0.002 | $K_{C,2}$ | −0.04 | $\delta_C$ | [−0.1, 0.1] |
| $K_0$ | 0.1 | $h_{min}$[m] | 4 | $h_{max}$[m] | 32 |

TABLE 2

Initial conditions and parameters in intention estimation example

| Parameter | Value | Parameter | Value |
|---|---|---|---|
| $v_{xe}(0) \left[\frac{m}{s}\right]$ | [22, 26] | $v_{xe} \left[\frac{m}{s}\right]$ | [0, 34] |
| $y_e(0)$ [m] | [1.85, 2.15] | $y_e$ [m] | [0.9, 2.8] |
| $h(0)$ [m] | [10, 20] | $v_{xl} \left[\frac{m}{s}\right]$ | [10, 28] |
| $v_{xl}(0) \left[\frac{m}{s}\right]$ | [21, 23] | $u_{xe} \left[\frac{m}{s^2}\right]$ | [−4.2, 4.2] |
| $\delta t$ [s] | 0.25 | $v_{ye} \left[\frac{m}{s}\right]$ | [−2.5, 2.5] |
| $u_{xl} \left[\frac{m}{s^2}\right]$ | [−4.2, 4.2] | $v_{xl}^{des} \left[\frac{m}{s}\right]$ | 22 |

Next, we provide simulation results for three case studies that demonstrate the efficacy of the proposed intention-aware overtaking algorithm for ε in the presence of O:

Case 1: The intention of $\mathcal{L}$ is not known (i.e., i=N). The control law for ε is $u_{xd} = u_{xl,N0} + \delta_N^{min} = C_d v_{tr}^{avg} + \delta_N^{min}$.

Case 2: The intention of $\mathcal{L}$ is known and the driver is cautious (i.e., i=C), then $u_{xd} = u_{xl,C0} + \delta_C^{min}$.

Case 3: The intention of $\mathcal{L}$ is known and the driver is annoying (i.e., i=A), then $u_{xd} = u_{xl,A0} + \delta_A^{min}$.

Figure 4:
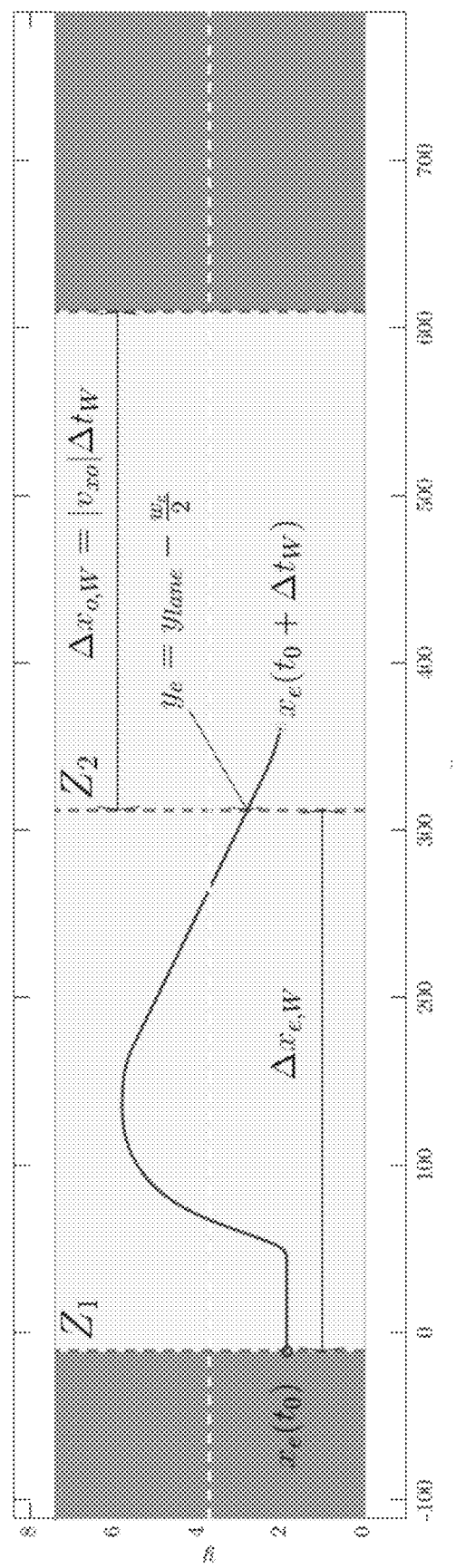
FIG. 4 shows initial conditions of an oncoming vehicle for an unsafe overtake.

For the chosen $r_d(t_0) = [x_1(t_0) + |\bar{x}_l(t_0)| y_e(t_0)]^T$, we calculate the worst-case time and x-distance traveled by ε before it overtakes $\mathcal{L}$, assuming maximum relative velocity of $\mathcal{L}$ relative to $r_d$, i.e., $\bar{v}_{xl} = \bar{v}_{xl}^{max}$. Denote the worst-case time and x-distance by $\Delta t_W$ and $\Delta x_{e,W}$, respectively, see FIG. 4, and the corresponding actual values as $\Delta t$ and $\Delta x_e$, respectively.

The ego vehicle ε is safe with respect to the lead vehicle $\mathcal{L}$ as established in the previous section. To ensure that it is also safe with respect to O, we require $\|r_e(t) - r_o(t)\|_{E_\infty} > 1$ for all $t \in [t_0, t_0 + \Delta t_W]$. Then, if $r_o(t) \notin Z_1 = \{(r_o \in \mathbb{R} | x_e(t_0) < x_0(t) < x_e(t_0) + \Delta x_{e,W}\}$, we have $\|r_e(t) - r_o(t)\|_{E_\infty} > 1$, for all $t \in [t_0, t_0 + \Delta t_W]$. For this to hold, O should start outside the region $Z_1 \cup Z_2$, shown in FIG. 4, so that O does not enter $Z_1$ during the worst-case overtake maneuver of E, whose trajectory is denoted with the blue curve. This implies that $(X_0(t_0) < x_e(t_0))$ OR $(x_0(t_0) - x_e(t_0)) > \Delta x_{e,W} + \Delta t_W |v_{xo}(t_0)|)$, i.e., O requires at least $\Delta t_W$ seconds to enter the unsafe zone $Z_1$ if it starts with $x_e(t_0) < x_o(t_0)$ or it has already crossed $Z_1$ and thereby renders the overtake by ε safe.

Table 4 shows $\Delta t$, $\Delta x$, $\Delta t_W$, $\Delta x_W$ and the cumulative control effort during the overtake, $U = \int_{t_0}^{t_0 + \Delta t} u_{xe}$ for the three cases with the initial conditions for ε, $\mathcal{L}$, O, as given in Table 3. It can be observed that, when there is no estimation of the intention of $\mathcal{L}$, then it is deemed unsafe for ε to overtake for the given initial conditions. However, if ε estimates the intention as in Cases 2 and 3, then overtaking is deemed safe. Additionally, when the $\mathcal{L}$'s driver is cautious, the x-distance that ε traveled to overtake $\mathcal{L}$ and the control effort during the overtake U is smaller than the corresponding values when the $\mathcal{L}$'s driver is annoying. This is expected because the cautious driver slows down to ease out the overtaking maneuver of ε. Intention estimation helps in effectively deciding whether to overtake or not, and also in guiding ε smoothly to overtake $\mathcal{L}$ in the presence of O.

Figure 5A:
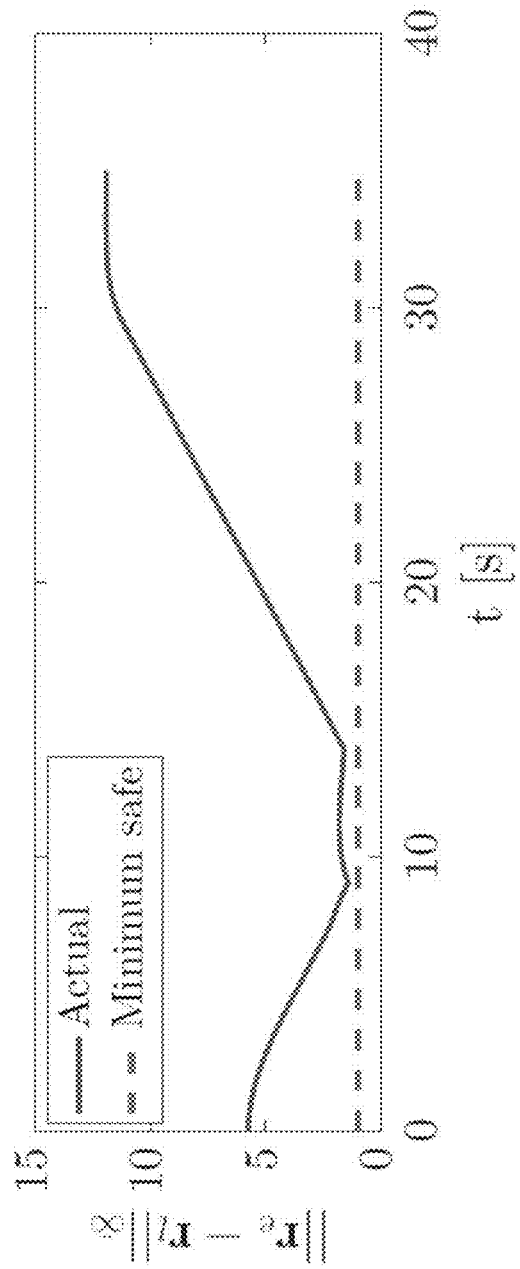
FIG. 5A shows a graph of weighted ∞-norm distances between an ego car, $\varepsilon$, and a lead car, $\mathcal{L}$.
Figure 5B:
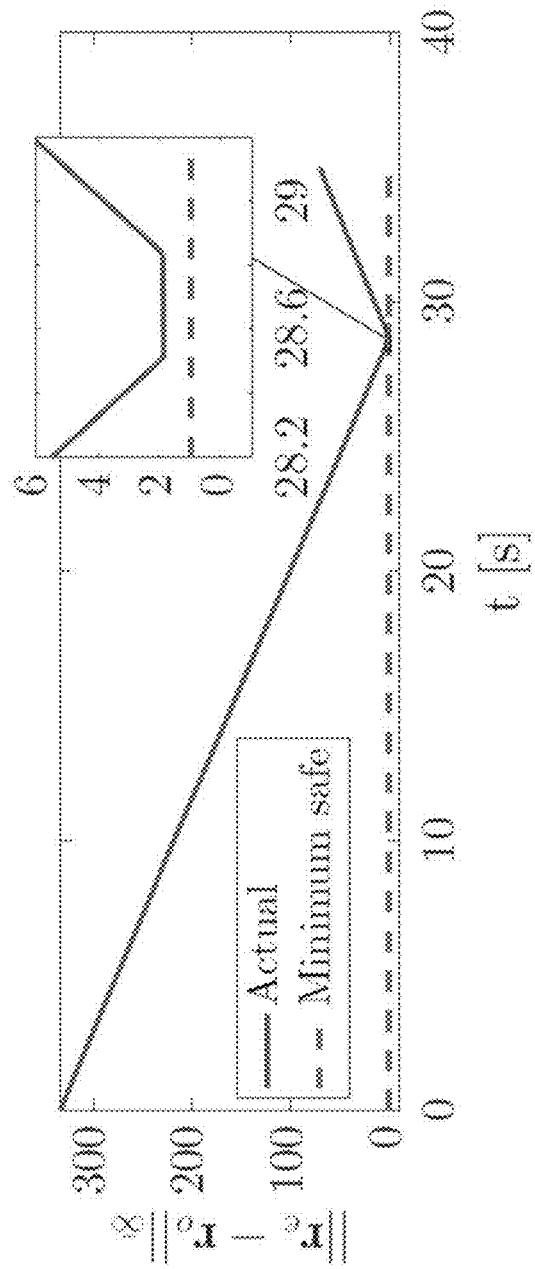
FIG. 5B shows a graph of weighted ∞-norm distances between an ego car, $\varepsilon$, and an oncoming car, O.
Figure 6A:
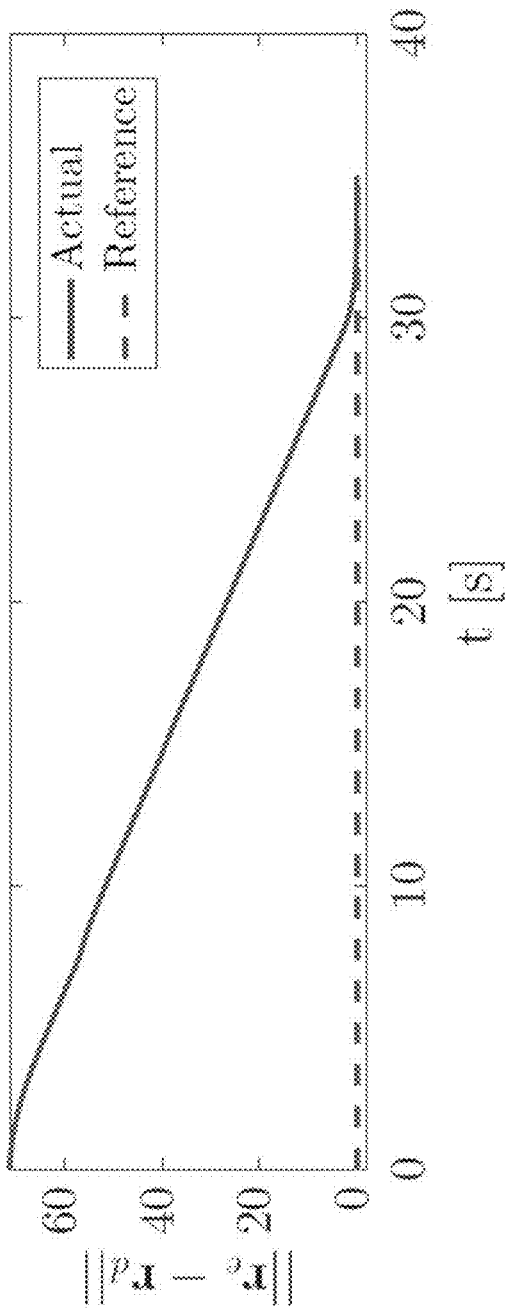
FIG. 6A shows 2-norm distance between an ego car, $\varepsilon$, and a desired point $r_d$ ahead of a lead car, $\mathcal{L}$.
Figure 6B:
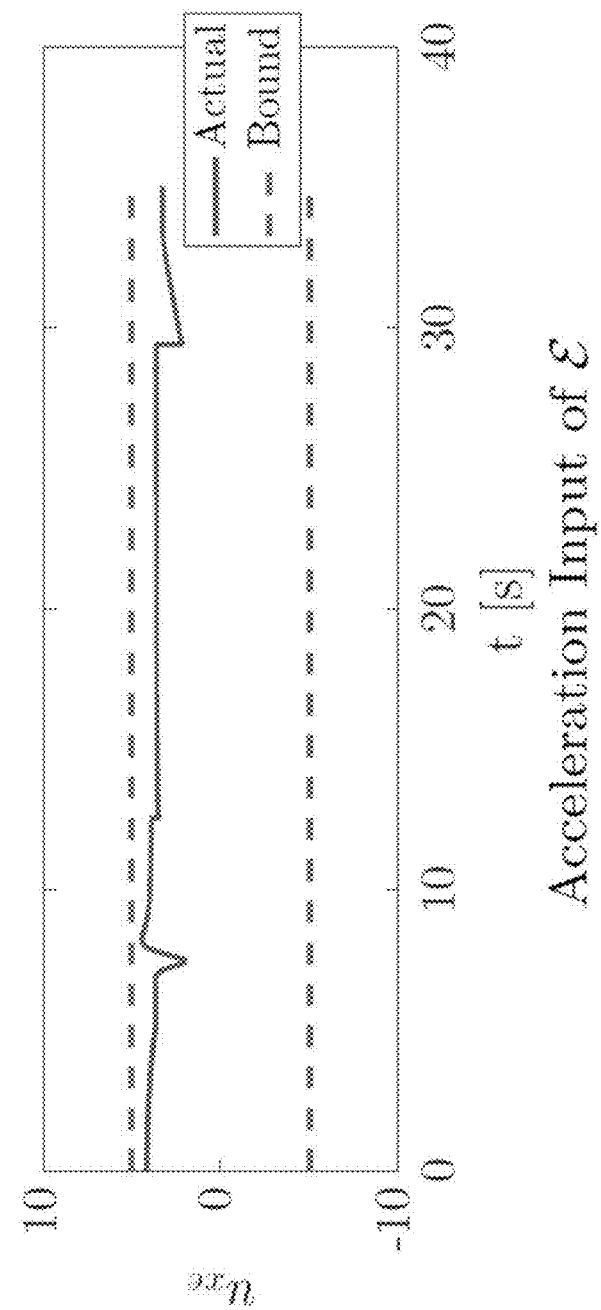
FIG. 6B shows an acceleration input of an ego car, $\varepsilon$.

FIGS. 5A and 5B show the oo-distances between ε and $\mathcal{L}$, and between ε and O, respectively, for the Case 3 when $\mathcal{L}$'s driver is annoying. As observed in FIGS. 5A and 5B, the o-distances are always greater than 1, demonstrating that there is no collision between ε and the other two vehicles. FIG. 6A shows the 2-norm distance between ε and $r_d$, which goes to zero in finite time, and hence ε converges to the desired dynamics (26) in finite time. Moreover, FIG. 6B shows that control input applied by ε is within the control bounds for all times.

TABLE 3

Initial conditions and other parameters

| Initial Conditions | | | | Other Parameters | |
|---|---|---|---|---|---|
| | j = e | j = 1 | j = 0 | Parameter | Value |
| $x_j(0)$ [m] | −22.96 | 0 | 835.19 | $[\delta_N^{min}, \delta_N^{max}]$ | [−0.15, 0.15] |
| $y_j(0)$ [m] | 1.85 | 2.8 | 5.55 | $\bar{v}_e^{over}$ | 2.5 |
| $v_{xj}(0)$ [m] | 22 | 22 | −22 | $R_e^f$ | 3 |
| | | | | $|u_e^{max, over}|$ | 8.7 |
| Road Parameters | | | | | |
| $y_{lane}$ | 3.7 | $l_c$ | 4 | $w_c$ | 1.8 | $C_d$ | 0.15 |

TABLE 4

Comparison of 3 cases ($x_0(t_0) - x_e(t_0) = 1335$)

| Case (Intent) | $\Delta x_{e,W}$[m] ($\Delta t_W$[s]) | $\Delta x_{o,W}$ [m] | Is overtake safe? | $\Delta x_e$[m]($\Delta t$[s]) | U |
|---|---|---|---|---|---|
| 1 (N) | 1588.10 (65.45) | 1439.90 | No | — | — |
| 2 (C) | 650.14 (29.34) | 645.48 | Yes | 559.97 (25.07) | 86.30 |
| 3 (A) | 714.86 (29.34) | 645.48 | Yes | 616.23 (25.08) | 94.98 |

Example 1

Figure 7:
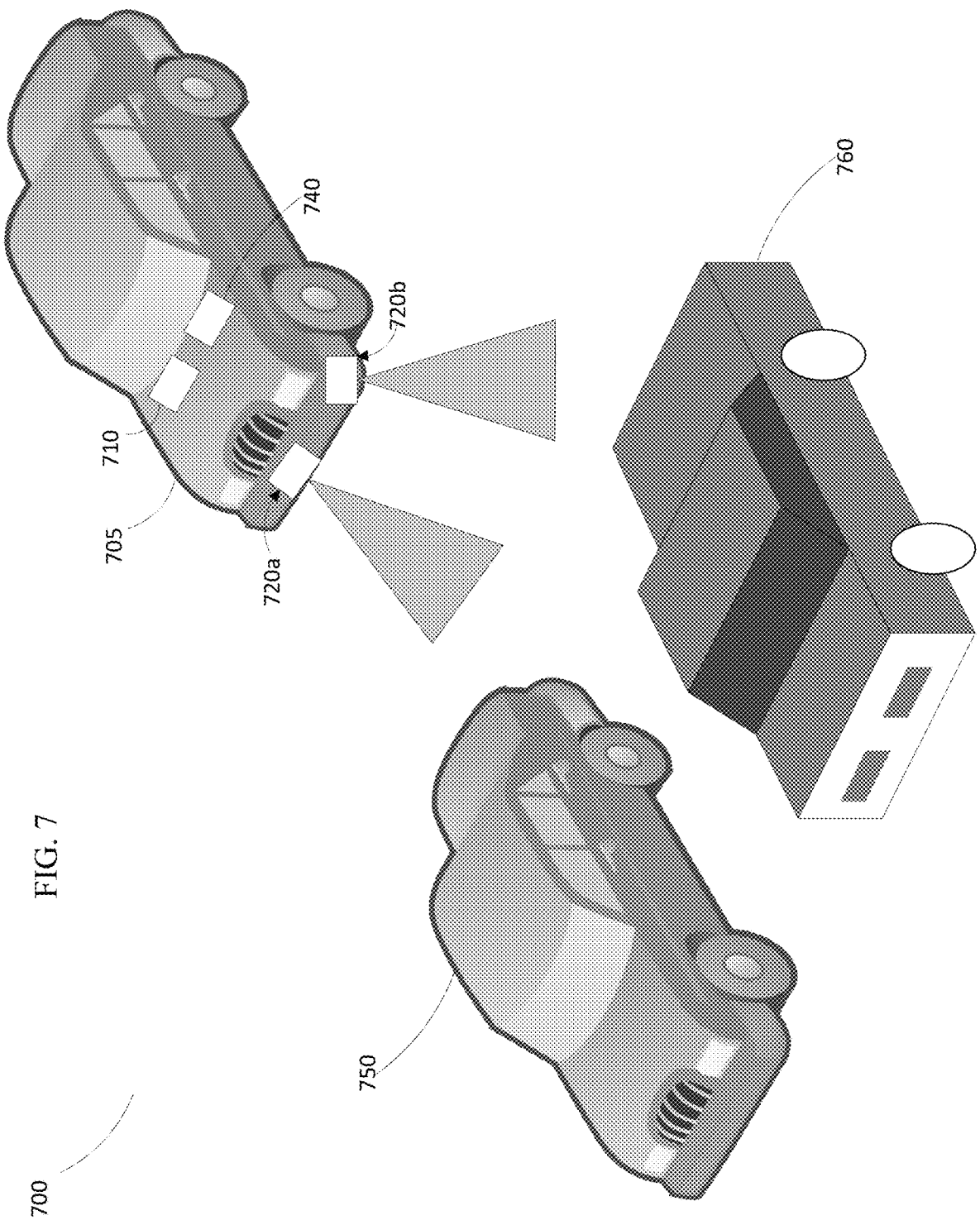
FIG. 7 shows an exemplary embodiment of an overtaking with an intention estimation system.

Referring now to FIG. 7, an exemplary embodiment of a overtaking with intention estimation system 700 is shown. The system includes a plurality of sensors are coupled to the ego vehicle 705. The sensors can sense information associated with the ego vehicle 705, a lead vehicle 750, and/or an oncoming vehicle 760. The lead vehicle 750 may be traveling on a roadway in the same direction and lane as the ego vehicle 705. The oncoming vehicle 760 may be traveling in the opposite direction of the ego vehicle 705, and may be traveling in a different lane of the roadway. The plurality of sensors can include a first sensor 710 that can be a speedometer global positioning system sensor, or other applicable sensor configured to sense a speed and/or velocity of the ego vehicle 710.

The first sensor can be coupled to a controller 740 having a memory and a processor and coupled to the ego vehicle 705. The controller 740 can have an overtaking with intention estimation algorithm stored in the memory, which will be explained in detail in FIG. 8. The controller 740 can be coupled to a vehicle control system (not shown) of the ego vehicle 705. The vehicle control system can be an autonomous or semi-autonomous vehicle control system with any number of controllers, interfaces, actuators, and/or sensors capable of controlling a motor, engine, transmission, braking system, steering system, or other subsystem of the ego vehicle. The vehicle control system can be used to perform a vehicle maneuver such as overtaking a lead vehicle 750, stopping the ego vehicle 705, or following the lead vehicle 750. In some embodiments, the controller 740 may be a portion of the vehicle control system.

The plurality of sensors can include a second sensor 720 coupled to the controller 740 and configured to sense surroundings of the ego vehicle 705. The second sensor 720 can be a sensor such as a LiDAR sensor, a camera such as an infrared camera or visible light camera, an ultrasonic sensor, a radar sensor, or any other type of sensor capable of sensing the location, speed, and or velocity of objects around the ego vehicle 705. The second sensor 720 may sense information about a location, speed, or velocity of the lead vehicle 750 or oncoming vehicle 760. The information, either directly or indirectly, may be used by the controller 740 to calculate a location of the lead vehicle 750 relative to the ego vehicle 705, a headway distance between the lead vehicle 750 and the ego vehicle 705, a lateral velocity or acceleration of the lead vehicle 750, a longitudinal velocity or acceleration of the lead vehicle 750, a location of the oncoming vehicle 760 relative to the ego vehicle 705, a lateral velocity or acceleration of the oncoming vehicle 760, or a longitudinal velocity or acceleration of the oncoming vehicle 760, a lateral location of the ego vehicle 705, and/or a lateral location of the lead vehicle 750. Lateral location can be the location of the vehicle within a lane or the location along the j direction shown in FIG. 1, while longitudinal location can be the location of the vehicle within a lane or the location along the f direction shown in FIG. 1. The second sensor 720 can be capable of sensing a speed or velocity of an object natively. Alternatively, the speed or velocity of the object can be calculated by the controller 740 information sensed by the sensor using methods known in the art, such as deriving a velocity of a vehicle from location information sensed by a LiDAR sensor.

Any number of first sensors 710 and second sensors 720 can be coupled to the ego vehicle 705 in order to improve the speed, velocity, and/or object location sensing capabilities of the ego vehicle 705. For example, multiple second sensors 720a and 720b can be mounted to the front of the ego vehicle 705. The second sensors 720 may include different sensor types, i.e., some of the second sensors 720 are cameras while others are LiDAR sensors. The plurality of sensors can be divided up as a number of sub-pluralities of sensors, i.e. a first plurality of sensors, a second plurality of sensors, and a third plurality of sensors. Some of the sub-pluralities of sensors may share sensors, i.e. a sensor may belong to the first plurality of sensors and the second plurality of sensors. It is contemplated that a single sensor capable of sensing all of the parameters described above could be used in place of the first sensor 710 and second sensor 720. Additionally, multiple controllers 740 may be used in order to implement the overtaking with intention estimation system 700.

Referring now to FIG. 7 as well as FIG. 8, an exemplary embodiment of process 800 for implementing an overtaking with intention estimation algorithm is shown. Generally, the process performs an input control sequence using a driving control system of an ego vehicle, determines an intention of a lead vehicle, and performs a driving maneuver based on the intention. The process 800 can be implemented as instructions on a memory of a computational device such as the controller 740.

At 804, the process can determine an optimal input control sequence for the ego vehicle. The input control sequence can include a number of discrete time points, each of which have an associated longitudinal acceleration and lateral velocity value. The input control sequence $u_T^*$ can be determined using equations (15a)-(15d). In some embodiments, the input control sequence may be predetermined, and the process 800 may not include 804. The process 800 may then proceed to 808.

At 808, the process 800 can receive information about the lead vehicle and the ego vehicle from a plurality of sensors coupled to the ego vehicle, cause the vehicle control system to execute at least a portion of the input control sequence, and execute a model selection algorithm. The process 800 can cause the vehicle control system to control the ego vehicle have the longitudinally acceleration and the lateral velocity specified by the input control sequence at a given time point. The process 800 can receive lead vehicle data which can be used to directly or indirectly determine a velocity of the lead vehicle, a location of the lead vehicle relative to the ego vehicle, a headway separation distance between the lead vehicle and the ego vehicle, a lateral location of the ego vehicle, and/or a lateral location of the lead vehicle. The process 800 can then provide the lead vehicle data, the ego vehicle data, and/or the velocity of the lead vehicle to the model selection algorithm. The model selection algorithm can include an aggressive vehicle model and a cautious driver model. The vehicle models can include equation (5), with $K_{A,1}>0$ and $K_{A,2}>0$ for the aggressive vehicle model and $K_{C,1}<0$ and $K_{C,2}<0$ for the cautious vehicle model. The model selection algorithm can then estimate if the lead vehicle data, the ego vehicle data, and/or the velocity of the lead vehicle has an aggressive intention, or a cautious intention by utilizing the aggressive vehicle model and the cautious vehicle model in conjunction with equations (18a)-(18d). The process 800 can then proceed to 812.

At 812, the process 800 can determine if the estimated intention of the lead vehicle is unknown. If the intention is unknown, the process 800 can proceed to 808 (i.e. "NO" at 812) in order to execute the next time point of the input control sequence. The process 800 is guaranteed to estimate either an aggressive intention or a cautious intention by the end of the input control sequence. If the intention is either aggressive or cautious (i.e. "YES" at 812), the process 800 can proceed to 816.

At 816, the process 800 can receive information about the lead vehicle, the ego vehicle, and an oncoming vehicle from the plurality of sensors coupled to the ego vehicle. The information can be used to directly or indirectly determine a location of the lead vehicle relative to the ego vehicle, a headway distance between the lead vehicle and the ego vehicle, a lateral velocity or acceleration of the lead vehicle, a longitudinal velocity or acceleration of the lead vehicle, a location of the oncoming vehicle relative to the ego vehicle, a lateral velocity or acceleration of the oncoming vehicle, a longitudinal velocity or acceleration of the oncoming vehicle, a longitudinal location of the lead vehicle relative to the ego vehicle, a longitudinal location of the oncoming vehicle relative to the ego vehicle, a lateral location of the oncoming vehicle relative to the ego vehicle, and/or a lateral location of the lead vehicle relative to the ego vehicle. The process 800 may continue to receive at least a portion of the above information during subsequent steps of the process 800. The process 800 can provide the information received to subsequent steps of the process 800. The process can then proceed to 820.

At 820, the process 800 can determine whether the ego vehicle can perform an overtaking maneuver while keeping the ego vehicle within a predetermined set of safety constraints. The safety constraints may include the safety (Definition 1) and safe overtake (Definition 2) definitions found in the "Trajectory Generation and Control For The Ego Vehicle" section of this disclosure. The safety constraints may include a lateral separation distance between the ego vehicle and the lead vehicle, a longitudinal separation distance between the ego vehicle and the lead vehicle, a lateral separation distance between the ego vehicle and the oncoming vehicle, and/or a longitudinal separation distance between the ego vehicle and the oncoming vehicle. The process 800 can calculate a trajectory to navigate the ego vehicle to a desired point, which can be desired point $r_d$, located a safe distance in front of the lead vehicle. The safe distance can be $|\bar{x}_l(t_0)|$ which can be found by initializing the safe distance to be $x_{rep}^{max}+R_e^f$ and updating the safe distance at regular time intervals using equation (34) as described above. The desired point can be subject to dynamics according to equation (26) and the estimated intention of the lead vehicle. The process 800 can calculate the trajectory using a vector field such as vector field F. The vector field can be calculated using equation (25). The vector field can be used to calculate a desired velocity profile for the ego vehicle. The desired velocity profile can be calculated using equation (28). The process may determine if the ego vehicle can pass the lead vehicle by calculating a worst-case trajectory based on a worst-case overtaking time and x-distance which can be $\Delta t_W$ and $\Delta x_{e,W}$. The worst-case time and x-distance can be calculated using a maximum expected lead vehicle velocity such as $\bar{v}_{xl}^{max}$, which is the maximum value of a predetermined lead vehicle velocity range. The predetermined lead vehicle velocity range and other vehicle parameter ranges such as those found in Table 2 may be predetermined before the process 800 begins. The process 800 can then estimate the location of the oncoming vehicle during the worst-case trajectory. In some embodiments, the process 800 may estimate the projected position of the oncoming vehicle during the worst-case trajectory by assuming the oncoming vehicle moves with constant velocity. If the oncoming vehicle is determined to violate any of the safety constraints during the worst-case trajectory, the overtaking maneuver may be determined to be unsafe. If the oncoming vehicle is not determined to violate any of the safety constraints during the worst-case trajectory, the overtaking maneuver may be determined to be safe. The process 800 can then proceed to 824.

At 824, the process 800 can receive the safety determination of the overtaking maneuver. If the overtaking maneuver is determined to be safe (i.e. "YES" at 824), the process 800 can proceed to 828. If the overtaking maneuver is determined to be unsafe (i.e. "NO" at 824), the process 800 can proceed to 832.

At 828, the vehicle can perform the overtaking maneuver while staying within the predetermined safety constraints and receive information about the lead vehicle, the ego vehicle, and an oncoming vehicle from the plurality of sensors coupled to the ego vehicle. The information can be used to directly or indirectly determine a location of the lead vehicle relative to the ego vehicle, a headway distance between the lead vehicle and the ego vehicle, a lateral velocity or acceleration of the lead vehicle, a longitudinal velocity or acceleration of the lead vehicle, a location of the oncoming vehicle relative to the ego vehicle, a lateral velocity or acceleration of the oncoming vehicle, a longitudinal velocity or acceleration of the oncoming vehicle, a longitudinal location of the lead vehicle relative to the ego vehicle, a longitudinal location of the oncoming vehicle relative to the ego vehicle, a lateral location of the oncoming vehicle relative to the ego vehicle, and/or a lateral location of the lead vehicle relative to the ego vehicle. The overtaking maneuver can include maneuvering the ego vehicle to the desired point in front of the lead vehicle using an overtaking trajectory. The overtaking trajectory can be the path taken by the ego vehicle when following a desired velocity profile such as the desired velocity profile in equation (28). The desired velocity profile can be used to determine control inputs for the longitudinal acceleration and lateral velocity of the ego vehicle. The control inputs can be provided to the driving control system in order to pilot the vehicle along the trajectory to reach the desired point. If at any point during the overtaking maneuver the predetermined safety constraints are violated or are projected to be violated, the vehicle control system may perform a safety maneuver in order to protect the ego vehicle. For example, the safety maneuver can be stopping the ego vehicle in response to determining from sensor information that the lead vehicle has stopped. The ego vehicle may then cancel or restart the overtaking maneuver. The process 800 can then proceed to 832.

At 832, the process 800 can continue driving within the predetermined safety constraints. If the ego vehicle performed the overtaking maneuver, the ego vehicle can perform a cruising maneuver. The cruising maneuver can include continuing to track the desired point with a predetermined constant cruise speed that may be based on an average traffic speed of the roadway. If the ego vehicle did not perform the overtaking maneuver, the ego vehicle may perform a following maneuver. The following maneuver may include following the lead vehicle with a minimum separation distance between the lead vehicle and ego vehicle. Regardless of whether or not the overtaking maneuver was performed, the ego vehicle may continue driving within the predetermined driving safety constraints. The process 800 may then end. In some embodiments, the process 800 could proceed to 804 in order to restart the overtaking process.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIG. 8 can be executed or performed in any order or sequence not limited to the order and sequence shown and described in the figures. Also, some of the above steps of the processes of FIG. 8 can be executed or performed substantially simultaneously where appropriate or in parallel to reduce latency and processing times.

Thus, the invention provides an improved method of overtaking of a lead vehicle by an autonomous ego vehicle in the presence of an oncoming vehicle.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] J. Van Brummelen, M. O'Brien, D. Gruyer, and H. Najjaran, "Autonomous vehicle perception: The technology of today and tomorrow," Transportation research part C: emerging technologies, 2018.

[2] W. Schwarting, J. Alonso-Mora, and D. Rus, "Planning and decision-making for autonomous vehicles," Annual Review of Control, Robotics, and Autonomous Systems, 2018.

[3] S. Lefivre, D. Vasquez, and C. Laugier, "A survey on motion prediction and risk assessment for intelligent vehicles," Robomech Journal, vol. 1, no. 1, p. 1, 2014.

[4] C. Katrakazas, M. Quddus, W.-H. Chen, and L. Deka, "Realtime motion planning methods for autonomous on-road driving: State-of-the-art and future research directions," Transportation Research Part C: Emerging Technologies, vol. 60, pp. 416-442, 2015.

[5] N. Murgovski and J. Sjöberg, "Predictive cruise control with autonomous overtaking," in 2015 IEEE 54th Conference on Decision and Control, 2015, pp. 644-649.

[6] J. F. Fisac, E. Bronstein, E. Stefansson, D. Sadigh, S. S. Sastry, and A. D. Dragan, "Hierarchical game-theoretic planning for autonomous vehicles," arXiv:1810.05766, 2018.

[7] A. Carvalho, Y. Gao, S. Lefevre, and F. Borrelli, "Stochastic predictive control of autonomous vehicles in uncertain environments," in 12th Int. Sym. on Advanced Vehicle Control, 2014.

[8] G. Cesari, G. Schildbach, A. Carvalho, and F. Borrelli, "Scenario model predictive control for lane change assistance and autonomous driving on highways," IEEE Intelligent Transportation Systems Magazine, vol. 9, no. 3, pp. 23-35, 2017.

[9] M. Wang, Z. Wang, S. Paudel, and M. Schwager, "Safe distributed lane change maneuvers for multiple autonomous vehicles using buffered input cells," in 2018 IEEE International Conference on Robotics and Automation, May 2018, pp. 1-7.

[10] R. Nikoukhah and S. Campbell, "Auxiliary signal design for active failure detection in uncertain linear systems with a priori information," Automatica, vol. 42, no. 2, pp. 219-228, February 2006.

[11] J. K. Scott, R. Findeison, R. D. Braatz, and D. M. Raimondo, "Input design for guaranteed fault diagnosis using zonotopes," Automatica, vol. 50, no. 6, pp. 1580-1589, June 2014.

[12] Y. Ding, F. Harirchi, S. Z. Yong, E. Jacobsen, and N. Ozay, "Optimal input design for affine model discrimination with applications in intention-aware vehicles," in ACM/IEEE International Conference on Cyber-Physical Systems, 2018, available from: arXiv:1702.01112.

[13] K. Singh, Y. Ding, N. Ozay, and S. Z. Yong, "Input design for nonlinear model discrimination via affine abstraction," in IFAC World Congress, vol. 51, no. 16, 2018, pp. 175-180.

[14] Gurobi Optimization Inc., "Gurobi optimizer reference manual," 2015.

[Online]. Available: http://www.gurobi.com

[15] IBM ILOG CPLEX, "V12. 1: User's manual for CPLEX," Int. Business Machines Corporation, vol. 46, no. 53, p. 157, 2009.

[16] F. Harirchi, S. Z. Yong, E. Jacobsen, and N. Ozay, "Active model discrimination with applications to fraud detection in smart buildings," in IFACWorld Congress, vol. 50, no. 1, 2017, pp. 9527-9634.

[17] R. Volpe and P. Khosla, "Manipulator control with superquadric artificial potential functions: Theory and experiments." IEEE Transactions on Systems, Man, and Cybernetics, vol. 20, no. 6, pp. 1423-1436, 1990.

[18] K. Garg and D. Panagou, "New results on finite-time stability: Geometric conditions and finite-time controllers," in 2018 American Control Conference, June 2018, pp. 442-447.

[19] D. Panagou, "A distributed feedback motion planning protocol for multiple unicycle agents of different classes," IEEE Trans. on Automatic Control, vol. 62, no. 3, pp. 1178-1193, 2017.

The citation of any document is not to be construed as an admission that it is prior art with respect to the present invention.

What is claimed is:

1. A method implemented by a data processing system comprising at least one processor and at least one memory, the at least one memory comprising a plurality of dynamics models and instructions executed by the at least one processor to implement a vehicle overtaking system, the method comprising:

determining, at a first time, an input control sequence for an ego vehicle, the input control sequence comprising a plurality of acceleration values of the ego vehicle, the plurality of acceleration values being determined to ensure that an observed trajectory of a lead vehicle over a finite time horizon is only consistent with one dynamics model of the plurality of dynamics models, wherein the first time is prior to the finite time horizon, wherein the input control sequence is designed to ensure that output trajectories of each of the plurality of dynamics models differ by a predetermined threshold in at least one time instance within a testing period. wherein the testing period is prior to the finite time horizon;

causing a vehicle control system in the ego vehicle to execute at least a first acceleration value of the plurality of acceleration values of the input control sequence;

receiving, from a first plurality of sensors coupled to the ego vehicle, lead vehicle data about the lead vehicle;

estimating an intention of the lead vehicle by selecting a dynamics model predictive of a maneuver of the lead vehicle that includes a physics-based parameter based on the lead vehicle data;

generating a desired location ahead of the lead vehicle based on the dynamics model corresponding to the estimated intention;

calculating, based on the desired location, a trajectory for the ego vehicle, the trajectory calculated to move the ego vehicle toward the desired position; and causing the vehicle control system to perform a vehicle maneuver based on the calculated trajectory.

2. The method of claim 1 further comprising:

receiving, from a second plurality of sensors coupled to the ego vehicle, oncoming vehicle data about an oncoming vehicle; and receiving, from a third plurality of sensors coupled to the ego vehicle, ego vehicle data about the ego vehicle.

3. The method of claim 2, wherein at least one sensor of the first plurality of sensors belongs to the second plurality of sensors and the third plurality of sensors.

4. The method of claim 2, wherein the input control sequence comprises a plurality of discrete time points and at least a portion of the ego vehicle data, lead vehicle data, and the oncoming vehicle data is associated with one of the discrete time points.

5. The method of claim 2, wherein the vehicle maneuver comprises:
determining the ego vehicle is unable to overtake the lead vehicle while keeping the ego vehicle within a predetermined set of safety constraints based on at least one of the ego vehicle data, lead vehicle data, oncoming vehicle data, or the estimated intention of the lead vehicle; and
piloting the ego vehicle to follow behind the lead vehicle within the predetermined set of safety constraints.

6. The method of claim 5, wherein the predetermined set of safety constraints comprises a predetermined headway separation distance between the ego vehicle and the lead vehicle.

7. The method of claim 2, wherein the vehicle maneuver comprises:
determining the ego vehicle is able to overtake the lead vehicle while keeping the ego vehicle within a predetermined set of safety constraints based on at least one of the ego vehicle data, lead vehicle data, oncoming vehicle data, or the estimated intention of the lead vehicle; and
piloting the ego vehicle along a trajectory to overtake the lead vehicle within the predetermined set of safety constraints.

8. The method of claim 7, wherein the method further comprises calculating the trajectory based on an ego vehicle speed, a lead vehicle speed, an ego vehicle location, and a lead vehicle location, wherein each of the ego vehicle speed, the lead vehicle speed, the ego vehicle location, and the lead vehicle location are based on at least one of the ego vehicle data and the lead vehicle data.

9. The method of claim 7, wherein the determining the ego vehicle is able to overtake the lead vehicle while keeping the ego vehicle within the predetermined set of safety constraints is further based on at least one of an oncoming vehicle speed and an oncoming vehicle location, each of the oncoming vehicle speed and the oncoming vehicle location based on the oncoming vehicle data.

10. The method of claim 1, wherein determining the intention of the lead vehicle comprises:
providing the lead vehicle data to a model selection algorithm;
receiving an output of the model selection algorithm;
determining a most likely intention of the lead vehicle based on the output of the model selection algorithm.

11. The method of claim 10, wherein the lead vehicle data comprises a lead vehicle speed.

12. A driving control system for an ego vehicle, the driving control system comprising:
a first plurality of sensors coupled to the ego vehicle; and
a controller in electrical communication with the first plurality of sensors, the controller being configured to execute a program stored in the controller to:
determine, at a first time, an input control sequence for the ego vehicle, the input control sequence comprising a plurality of acceleration values of the ego vehicle, the plurality of acceleration values being determined to ensure that an observed trajectory of a lead vehicle is consistent with only one dynamics model of a plurality of dynamics models, wherein the input control sequence is designed to ensure that output trajectories of each of the plurality of dynamics models differ by a predetermined threshold in at least one time instance within a testing period;
for each dynamics model of the plurality of dynamics models, calculate at least one physics-based parameter based on at least a portion of the input control sequence;
cause a vehicle control system in the ego vehicle to execute at least a portion of the input control sequence;
receive, from a first plurality of sensors coupled to the ego vehicle, lead vehicle data about the lead vehicle;
estimate an intention of the lead vehicle by selecting a dynamics model from the plurality of dynamics models, the dynamics model being selected based on the lead vehicle data and the at least one physics-based parameter corresponding to the dynamics model;
generate a desired location based on the lead vehicle data and the selected dynamics model;
generate, based on the selected dynamics model and the desired location, a velocity vector field for the ego vehicle, the velocity vector field generated to guide the ego vehicle around the lead vehicle to the desired location; and
cause the vehicle control system to perform a vehicle maneuver based on the velocity vector field and the estimated intention of the lead vehicle.

13. The system of claim 12 further comprising:
a second plurality of sensors coupled to the ego vehicle; and
a third plurality of sensors coupled to the ego vehicle, and wherein the controller is further configured to:
receive, from the second plurality of sensors coupled to the ego vehicle, oncoming vehicle data about an oncoming vehicle; and
receive, from the third plurality of sensors coupled to the ego vehicle, ego vehicle data about the ego vehicle.

14. The system of claim 13, wherein at least one sensor of the first plurality of sensors belongs to the second plurality of sensors and the third plurality of sensors.

15. The system of claim 13, wherein the input control sequence comprises a plurality of discrete time points and at least a portion of the ego vehicle data, lead vehicle data, and the oncoming vehicle data is associated with one of the discrete time points.

16. The system of claim 13, wherein the vehicle maneuver comprises additional steps in the program and the controller is further configured to:
determine the ego vehicle is unable to overtake the lead vehicle while keeping the ego vehicle within a predetermined set of safety constraints based at least one of the ego vehicle data, lead vehicle data, oncoming vehicle data, or the estimated intention of the lead vehicle; and
pilot the ego vehicle to follow behind the lead vehicle within the predetermined set of safety constraints.

17. The system of claim 16, wherein the predetermined set of safety constraints comprises a predetermined headway separation distance between the ego vehicle and the lead vehicle.

18. The system of claim 13, the vehicle maneuver comprises additional steps in the program and the controller is further configured to:
determine the ego vehicle is able to overtake the lead vehicle while keeping the ego vehicle within a predetermined set of safety constraints based on at least one of the ego vehicle data, lead vehicle data, oncoming vehicle data, or the estimated intention of the lead vehicle; and pilot the ego vehicle along a trajectory to overtake the lead vehicle within the predetermined set of safety constraints.

19. The system of claim 18, wherein the ego vehicle data comprises an ego vehicle speed and an ego vehicle location, the lead vehicle data comprises a lead vehicle speed and a lead vehicle location, wherein the controller is further configured to calculate the trajectory based on the ego vehicle speed, the lead vehicle speed, the ego vehicle location, and the lead vehicle location, and wherein the trajectory includes a desired location located ahead of the lead vehicle determined based on dynamics of the lead vehicle corresponding to the estimated intention.

20. The method of claim 1, wherein the physics-based parameter includes a longitudinal velocity.

21. The method of claim 1, wherein the physics-based parameter includes a longitudinal acceleration.

22. The method of claim 1, wherein the physics-based parameter includes a lateral velocity.

23. The method of claim 1, wherein the physics-based parameter includes a coefficient of drag.

24. The system of claim 12, wherein the physics-based parameter includes at least one of a longitudinal velocity, a longitudinal acceleration, a lateral velocity, a coefficient of drag, or combinations thereof.

25. A driving control system for an ego vehicle, the driving control system comprising:

a first plurality of sensors coupled to the ego vehicle; and a controller in electrical communication with the first plurality of sensors, the controller being configured to execute a program stored in the controller to:

determine, at a first time, an input control sequence for the ego vehicle, the input control sequence comprising a plurality of acceleration values of the ego vehicle, the plurality of acceleration values being determined to ensure that an observed trajectory of a lead vehicle is consistent with only one intention model of a plurality of intention models, wherein the input control sequence is designed to ensure that output trajectories of each of the plurality of intention models differ by a predetermined threshold in at least one time instance within a testing period;

for each intention model of a plurality of intention models, calculate at least one output trajectory for the lead vehicle based at least in part on the input control sequence;

cause a vehicle control system in the ego vehicle to execute at least a portion of the input control sequence;

receive, from the first plurality of sensors coupled to the ego vehicle, lead vehicle data about the lead vehicle;

estimate the intention of the lead vehicle by selecting an intention model from the plurality of intention models, the intention model being selected based on the lead vehicle data and the at least one output trajectory corresponding to the intention model;

generate a desired location for the ego vehicle based on the selected intention model;

generate, based on the desired location and the selected intention model, a vector field configured to guide the ego vehicle around the lead vehicle to the desired location; and cause the vehicle control system to perform a vehicle maneuver based on the generated vector field.

* * * * *